US010757569B2

(12) United States Patent
Wang et al.

(10) Patent No.: US 10,757,569 B2
(45) Date of Patent: Aug. 25, 2020

(54) PRIVACY PRESERVING AUTHENTICATION AND KEY AGREEMENT PROTOCOL FOR APPARATUS-TO-APPARATUS COMMUNICATION

(71) Applicant: Nokia Technologies Oy, Espoo (FI)

(72) Inventors: Mingjun Wang, Shaanxi (CN); Zheng Yan, Shaanxi (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/323,204

(22) PCT Filed: Aug. 5, 2016

(86) PCT No.: PCT/CN2016/093624
§ 371 (c)(1),
(2) Date: Feb. 4, 2019

(87) PCT Pub. No.: WO2018/023733
PCT Pub. Date: Feb. 8, 2018

(65) Prior Publication Data
US 2019/0174307 A1    Jun. 6, 2019

(51) Int. Cl.
*H04M 1/66*       (2006.01)
*H04W 12/02*      (2009.01)
(Continued)

(52) U.S. Cl.
CPC .............. *H04W 12/02* (2013.01); *H04L 9/006* (2013.01); *H04L 9/0643* (2013.01);
(Continued)

(58) Field of Classification Search
CPC .............. H04W 12/02; H04W 12/0401; H04W 12/04071; H04W 12/003;
(Continued)

(56) References Cited

U.S. PATENT DOCUMENTS 9,537,659 B2 *  1/2017  Yin ..................... H04L 9/3236
2007/0186109 A1  8/2007  Nyberg et al.
(Continued)

FOREIGN PATENT DOCUMENTS

CN    103929747 A    7/2014
CN    105592434 A    5/2016
(Continued)

OTHER PUBLICATIONS

International Search Report for PCT/CN2016/093624 dated Mar. 31, 2017.
(Continued)

*Primary Examiner* — Danh C Le
(74) *Attorney, Agent, or Firm* — Fay Sharpe LLP

(57) ABSTRACT

A method is disclosed, comprising obtaining, by a first apparatus, a first identifier associated with the first apparatus, wherein the first identifier is different from a second identifier associated with the first apparatus, providing, by the first apparatus, at least one message to at least one further apparatus of at least one further apparatus, wherein each of the at least one message comprises a key information of the first apparatus and is associated with the first identifier associated with the first apparatus, and determining, by the first apparatus, a session key of a communication session associated with the first apparatus and the at least one further apparatus, based on at least one message received, by the first apparatus, provided by at least one further apparatus of the at least one further apparatus, wherein each of the at least one message comprises a key information of the respective further apparatus and is associated with a first identifier associated with the respective further apparatus.

14 Claims, 14 Drawing Sheets

(51) Int. Cl.
  *H04L 29/06* (2006.01)
  *H04W 12/04* (2009.01)
  *H04L 9/08* (2006.01)
  *H04L 9/00* (2006.01)
  *H04W 12/00* (2009.01)
  *H04L 9/06* (2006.01)

(52) U.S. Cl.
  CPC .......... *H04L 9/0833* (2013.01); *H04L 9/0844* (2013.01); *H04L 9/0866* (2013.01); *H04L 9/0891* (2013.01); *H04L 63/0421* (2013.01); *H04L 63/065* (2013.01); *H04L 63/067* (2013.01); *H04W 12/003* (2019.01); *H04W 12/00512* (2019.01); *H04W 12/04* (2013.01); *H04W 12/0401* (2019.01); *H04W 12/04071* (2019.01)

(58) Field of Classification Search
  CPC ............ H04W 12/00512; H04W 12/04; H04L 9/006; H04L 9/0643; H04L 9/0833; H04L 8/0844; H04L 9/0866; H04L 9/0891; H04L 63/0421; H04L 63/065
  USPC ............ 455/410, 411, 418; 726/29; 713/171
  See application file for complete search history.

(56) References Cited

U.S. PATENT DOCUMENTS

| | | | | |
|---|---|---|---|---|
| 2007/0251997 | A1* | 11/2007 | Brown | ................ G06K 7/0008 235/380 |
| 2010/0229241 | A1 | 9/2010 | Liu et al. | |
| 2015/0288667 | A1* | 10/2015 | Alder | .................... H04L 63/061 713/171 |
| 2015/0382189 | A1 | 12/2015 | Zhang et al. | |
| 2016/0091871 | A1* | 3/2016 | Marti | ........................ G06F 3/01 702/188 |
| 2016/0099920 | A1* | 4/2016 | Meuleman | .......... H04L 63/0435 713/153 |
| 2016/0192287 | A1* | 6/2016 | Yang | .................... H04L 63/0853 455/411 |
| 2016/0269231 | A1* | 9/2016 | Bahr | .................... H04L 12/2803 |
| 2017/0221047 | A1* | 8/2017 | Veerasangappa Kadi | .................... G06F 21/606 |
| 2018/0254941 | A1* | 9/2018 | Kanaya | ............... H04L 61/6009 |
| 2019/0141041 | A1* | 5/2019 | Bhabbur | ................. G06F 21/62 |

FOREIGN PATENT DOCUMENTS

| | | |
|---|---|---|
| WO | WO 2013/176999 A1 | 11/2013 |
| WO | WO 2014/134786 A1 | 9/2014 |
| WO | WO 2014/165747 A1 | 10/2014 |
| WO | WO 2014/208034 A1 | 12/2014 |
| WO | WO 2015/065063 A1 | 5/2015 |
| WO | WO 2015/172288 A1 | 11/2015 |

OTHER PUBLICATIONS

Hsu Ruei-Hua, et al., "Group anonymous D2D communication with end-to-end security in LTE-A," 2015 IEEE Conference on Communications asnd Network Security (CNS), IEEE Sep. 28, 2015, pp. 451-459, XP032825427.

* cited by examiner

PRIVACY PRESERVING AUTHENTICATION AND KEY AGREEMENT PROTOCOL FOR APPARATUS-TO-APPARATUS COMMUNICATION

FIELD OF THE DISCLOSURE

The invention relates to the field of determining and/or negotiating a session key for a communication between apparatuses of a set of apparatuses, wherein this communication may represent a Device-to-Device (D2D) communication and wherein said determining and/or negotiating a session key may be based on a mutual authentication between the apparatuses of the set of apparatuses.

BACKGROUND

Recent demands on wireless and mobile communications motivate exploring new technologies to improve network performance in terms of overall throughput, spectrum utilization, energy consumption and so on. Meanwhile, the appearance of new commercial services such as location-based services and content sharing services encourage us to explore new paradigms to meet user demands. Device-to-Device (D2D) communications were proposed as one of the promising technologies for communications in the vicinity, which is supposed to play as a key role in the next generation mobile communication networks and wireless systems (i.e., 5G).

D2D communications refer to a type of technology that enables devices in the vicinity to communicate directly with each other under the control of existing network infrastructures such as Access Point (AP), Base Station (BS) and Core Networks (CN). It has shown great potential in improving communication capability, reducing communication delay and power dissipation, as well as fostering multifarious new applications and services. As a promising technology, D2D communications have drawn considerable attention in academia, industry and standard organizations in recent years. In academia, D2D communications were regarded as an underlay of LTE-Advanced network to improve communication performance. Many researchers have paid their attention on application scenarios, communication mode selection, resource allocation, power control and interference control. In industry, D2D communication-based application developments are active. For example, Qualcomm is developing a D2D communication sub-system in cellular networks, known as FlashLinQ, to make the communications among proximity devices possible. It is expected to complement traditional cellular networking based services and serve as a scalable platform for new types of applications, such as advertising, content sharing, and secure mobile payments. At the same time, the standardization work on D2D communications is on-going in standardization communities. The Third Generation Partnership Project (3GPP) is one of them. In 3GPP, D2D communication is defined as Proximity-Based Services (ProSe). Many technical issues are under discussion in the aspects of the feasibility study of the ProSe in LTE-A, system architecture and network entity functions, as well as extensive use case exploration. The above issues and more will be discussed and standardized over the next few years. Moreover, the studies on radio, service and other aspects are underway and will appear in future standardization.

In spite of the significant benefits, new application scenarios and system architecture expose D2D communications into unique security threats. Whether we can provide a secure and guaranteed D2D communication system is essential for the success of D2D services. One basic but significant open security issue is to establish a secure communication channel between a number of D2D devices.

SUMMARY OF SOME EMBODIMENTS OF THE INVENTION

According to a first exemplary aspect of the invention, a method is disclosed, which comprises (i) obtaining, by a first apparatus, a first identifier associated with the first apparatus, wherein the first identifier is different from a second identifier associated with the first apparatus, (ii) providing, by the first apparatus, at least one message to at least one further apparatus of at least one further apparatus, wherein each of the at least one message comprises a key information of the first apparatus and is associated with the first identifier associated with the first apparatus, and (iii) determining, by the first apparatus, a session key of a communication session associated with the first apparatus and the at least one further apparatus, based on at least one message received, by the first apparatus, provided by at least one further apparatus of the at least one further apparatus, wherein each of the at least one message comprises a key information of the respective further apparatus and is associated with a first identifier associated with the respective further apparatus.

The method according to the first exemplary aspect of the invention may for example at least partially be performed by the first apparatus.

According to the first exemplary aspect of the invention, furthermore a first apparatus is disclosed, which comprises means for at least partially realizing the method according to the first exemplary aspect of the invention. The means of the first apparatus may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the first apparatus may comprise various other components, like a radio interface, a data interface, a user interface etc.

For example, the first apparatus comprises at least one processor and at least one memory including computer program code, the at least one memory and the computer program code configured to, with the at least one processor, cause an apparatus at least to perform at least partially the method and/or the steps of the method according to the first exemplary aspect of the invention.

Furthermore, for instance, the first apparatus may represent device or a terminal or any other kind of mobile or stationary device, wherein the apparatus may represent a User Equipment (UE) of mobile communication network. Furthermore, it has to be noted that abbreviation UE used throughout this specification is not limited to a User Equipment but may represent any apparatus, e.g. a terminal or a mobile or stationary device.

The first apparatus and the at least one further apparatus may be configured to join a communication, e.g. through a communication network, wherein this communication may represent a Device-to-Device (D2D) communication. For instance, said first apparatus and the at least one further apparatus may be considered as a set of apparatuses. As an example, this D2D communication may be implemented by means of a direct path communication or a local path between two apparatuses of the set of apparatuses. For instance, in case of direct path communication between two apparatuses there is no intermediary between these two apparatuses, and, e.g., in case of local path communication between the apparatuses the communication may be performed via at least one node. The D2D communication may comprise proximity services (ProSe) of a mobile network, e.g. of 3GPP or of other mobile networks. Proximity services may refer to services that may be invoked when apparatus are within a physical proximity of each other, but, as another example, proximity services may also be applied by two apparatuses that are not physically close to each other. Furthermore, for instance, a D2D communication may represents a communication being under the control of a central network instance, wherein the central network instance may represent an Access Point (AP), or a Base Station (BS), or a Core Network (CN), or at least one eNodeB (EnB) or any other well-suited representation of a central network instance. Thus, the D2D communication between apparatuses of the set of apparatus may be assumed to be under control of the central network instance.

For instance, the second identifier may be a representative of a real identity of the first apparatus, wherein, as an example, this real identity may be a real identify of the first apparatus in a communication network. E.g., said real identifier may be one of IMSI or GUTI or IMEI code, wherein said real identifier may be registered at a central network instance. Furthermore, as an example, the first identifier may represent a private identifier or anonymized identifier or a pseudonym for the first apparatus, wherein, as an example, the first identifier may be not known to specific entities in the communication network.

As an example, in addition to the first apparatus there may be at least one further apparatus associated with the same communication network as the first apparatus. For instance, each of the at least one further apparatus may represent a further apparatus of type of the first apparatus mentioned above, i.e., each of the at least one further apparatus there may be associated with a first identifier, wherein the first identifier may represent a private identifier or anonymized identifier or a pseudonym for the respective further apparatus, and may be associated with a second identifier, wherein the second identifier may be a representative of a real identity of the respective further apparatus. E.g., said real identifier may be one of IMSI or GUTI or IMEI code, wherein said real identifier may be registered at a central network instance. Then, for instance, the second identifier of the first apparatus is not known to any of the at least one further apparatus, and, vice versa, the second identifier of each of the at least one further apparatus is not known to any other apparatuses of the set of first apparatus and the at least one further apparatus. Accordingly, privacy may be achieved between the first apparatus and each of the at least one further apparatus since the second identifier of an apparatus is not known to the other apparatus. This example definition of the first identifier as private identifier or anonymized identifier and of the second identifier as real identifier of the associated apparatus also holds for the other exemplary aspects of the invention.

According to a second exemplary aspect of the invention, a method, performed by at least one apparatus, is disclosed, said method comprising (i) receiving a second identifier of an apparatus of a set of apparatuses, the apparatuses of the set of apparatuses being associated with a communication session, (ii) determining a first identifier associated with the apparatus, wherein this apparatus is associated with the second identifier, (iii) determining a private key associated with the apparatus, and (iv) providing information to the apparatus comprising the first identifier of the apparatus.

According to the second exemplary aspect of the invention, furthermore at least one apparatus is disclosed, which comprises means for at least partially realizing the method according to the second exemplary aspect of the invention. The means of the at least one apparatus may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the at least one apparatus may comprise various other components, like a radio interface, a data interface, a user interface etc.

For example, the at least one apparatus comprises at least one processor and at least one memory including computer program code, the at least one memory and the computer program code configured to, with the at least one processor, cause at least one apparatus at least to perform at least partially the method and/or the steps of the method according to the second exemplary aspect of the invention.

For instance, said at least one apparatus according to the second exemplary aspect of the invention represents a central network instance, wherein the central network instance may represent an Access Point (AP), or a Base Station (BS), or a Core Network (CN), or at least one eNodeB (EnB) or any other well-suited representation of a central network instance. Thus, the communication between apparatuses of the set of apparatus may be assumed to be under control of the central network instance, wherein the communication session may represent a device-to-device (D2D) communication. For instance, said central network instance may represent a server.

According to a third exemplary aspect of the invention, a method, at least partially performed by a the apparatus of at least one first apparatus of the first exemplary aspect and performed by at least one apparatus of the second exemplary aspect of the invention, is disclosed, which comprises the steps of the method according to the first exemplary aspect of the invention and the steps of the method according to the second exemplary aspect of the invention.

According to a fourth exemplary aspect of the invention, furthermore a system is disclosed, which comprises the set of apparatuses, wherein each apparatus of the set of apparatuses is a first apparatus according to the first exemplary aspect of the invention and which comprises the at least one apparatus according to the second exemplary aspect of the invention.

In the following, the features of exemplary embodiments according to the first, second, third and fourth exemplary aspects of the invention are described by way of examples.

According to a corresponding exemplary embodiment of the methods according to the first exemplary aspect of the invention, the first apparatus is associated with a public key, wherein the public key can be determined based on the first identifier associated with the first apparatus and a first hash function.

According to a corresponding exemplary embodiment of the methods according to the first exemplary aspect of the invention, for each message of at least one message of the at least one message provided to at least one further apparatus of the at least one further apparatus the following is performed: (i) determining, by the first apparatus, a hash value based on the respective message and a second hash function, (ii) determining, by the first apparatus, a signature based on the hash value, the public key and a private key associated with the first apparatus, and (iii) providing, by the first apparatus, the signature to the further apparatus associated with the respective message.

According to a corresponding exemplary embodiment of the methods according to the first exemplary aspect of the invention, each message of at least one message of the at least one received message is verified.

According to a corresponding exemplary embodiment of the methods according to the first exemplary aspect of the invention, said verifying each message of at least one message of the at least one received message comprises for each message of the at least one message of the at least one received message: (i) determining, by the first apparatus, a hash value based on the respective message and a second hash function, and (ii) verifying, by the first apparatus, the respective message based on a signature associated with the message and based on the hash value and a public key associated with the further apparatus associated with the message, wherein the public key can be determined based on the first identifier associated with the first apparatus and a first hash function.

According to a corresponding exemplary embodiment of the methods according to the first exemplary aspect of the invention, it is determined, by the first apparatus, a first key hint, wherein the key information of a first message of the at least one message provided by the apparatus comprises said first key hint.

According to a corresponding exemplary embodiment of the methods according to the first exemplary aspect of the invention, the at least one further apparatus comprises a plurality of further apparatuses, and wherein said providing, by the first apparatus, at least one message to at least one further apparatus of at least one further apparatus, comprises providing the first message to a first further apparatus and to a second further apparatus of the plurality of further apparatuses.

According to a corresponding exemplary embodiment of the methods according to the first exemplary aspect of the invention, a first receive message of the at least one received message comprises a first key hint of the further apparatus associated with the first receive message.

According to a corresponding exemplary embodiment of the methods according to the first exemplary aspect of the invention, said at least one message received by the first apparatus are a plurality of received messages, wherein a second message of the plurality of receive massages comprises a first key hint of the further apparatus associated with the second receive message, the further apparatus associated with the second receive message being different from the further apparatus associated with the first receive message.

According to a corresponding exemplary embodiment of the methods according to the first exemplary aspect of the invention, it is determined, by the first apparatus, a first key based on the first key hint of the further apparatus associated with the first receive message, and, optionally, a second key based on the first key hint of the further apparatus associated with the second receive message.

According to a corresponding exemplary embodiment of the methods according to the first exemplary aspect of the invention, it is determined, by the first apparatus, based on the first key hint of the first receive message, and, optionally, based on the first key hint of the second receive message, a second key hint.

According to a corresponding exemplary embodiment of the methods according to the first exemplary aspect of the invention, it is provided, by the first apparatus, a second message to at least one further apparatus of the at least one further apparatus, the second message comprising the second key hint.

According to a corresponding exemplary embodiment of the methods according to the first exemplary aspect of the invention, the at least one further apparatus comprises a plurality of further apparatuses, and wherein said providing said second message comprises providing the second message to each further apparatus of the plurality of further apparatuses.

According to a corresponding exemplary embodiment of the methods according to the first exemplary aspect of the invention, said at least one message received by the first apparatus are a plurality of receive messages, wherein at least one message of the plurality of receive massages comprises at least one second key hint associated with at least one further apparatus of the at least one further apparatus.

According to a corresponding exemplary embodiment of the methods according to the first exemplary aspect of the invention, said determining the session key by the first apparatus is based on the at least one second key hint associated with the at least one further apparatus.

According to a corresponding exemplary embodiment of the methods according to the first exemplary aspect of the invention, the first identifier comprises a pseudonym identifier and at least one of: (i) an expiration date; and/or (ii) an identifier of a home network in which the first apparatus is registered; and/or (iii) an identifier of the network of a central network instance that has generated the first identifier.

According to a corresponding exemplary embodiment of the methods according to the first exemplary aspect of the invention, it is provided, by the first apparatus, the second identifier to a central network instance.

According to a corresponding exemplary embodiment of the methods according to the first exemplary aspect of the invention, it is received, by the first apparatus, information provided by a central network instance, the information comprising at least one of (i) the first identifier associated with the first apparatus, and/or (ii) a first hash function, and/or (iii) a second hash function, and/or (iv) a third hash function, and/or (v) a generator g, and/or (vi) a function e associated with bilinear pairing, and/or (vii) a systems public key, and/or (viii) a public key associated with the first apparatus, wherein the public key can be determined based on the first hash function and the first identifier associated with the first apparatus, and/or (ix) a private key associated with the first apparatus corresponding to the public key associated with the first apparatus, provided by the central network instance.

According to a corresponding exemplary embodiment of the methods according to the first exemplary aspect of the invention, it is provided, by the first apparatus, a group session request message to the central network instance, the group session request message comprising the second identifier of the first apparatus and the first identifier of each further apparatus of at least one further apparatus of the at least one further apparatus.

According to a corresponding exemplary embodiment of the methods according to the first exemplary aspect of the invention, the methods comprise receiving, by the first apparatus, group information provided by the central network instance, the group information comprising a first identifier of each of at least one further apparatus, wherein the at least one further apparatus and the first apparatus are associated with the communication session.

For instance, the communication session may be associated with a session identifier which might be denoted as $SID_I$.

According to a corresponding exemplary embodiment of the methods according to the first exemplary aspect of the invention, the methods comprise providing, by the first apparatus, a hash value based on the determined session key to a central network instance.

According to a corresponding exemplary embodiment of the methods according to the first exemplary aspect of the invention, the methods comprise receiving, by the first apparatus, an activation message provided by the central network instance.

According to a corresponding exemplary embodiment of the methods according to the first exemplary aspect of the invention, the methods comprise performing secure communication with one or more apparatuses of the at least one further apparatus during the communication session based on the determined session key.

According to a corresponding exemplary embodiment of the methods according to the first and second exemplary aspect of the invention, the first apparatus and the at least one further apparatus represent a group associated with the communication session, the methods comprising revoking the group based on at least one of an expiration date associated with the session key of the communication session, and/or a change of membership in the group, wherein said revoking the group comprises determining a new session key.

According to a corresponding exemplary embodiment of the methods according to the first and second exemplary aspect of the invention, if the expiration date associated with the session key is expired and there are no changes of the membership in the group, determining, by the first apparatus, the new session key based on a hash function and a random value.

According to a corresponding exemplary embodiment of the methods according to the first and second exemplary aspect of the invention, the random value is the expired session key.

According to a corresponding exemplary embodiment of the methods according to the first and second exemplary aspect of the invention, if the expiration date associated with the session key is not expired and if there is a change of the membership in the group, a message being indicative of the change of the membership in the group is provided from the first apparatus to a central network instance.

According to a corresponding exemplary embodiment of the methods according to the first and second exemplary aspect of the invention, it is received, by the first apparatus, a random number from the central network, and wherein said determining a new session key comprises determining the new session key based on a hash function and the random number.

According to a corresponding exemplary embodiment of the methods according to the first and second exemplary aspect of the invention, if said changes of the membership in the group comprises at least one new apparatus joining the group, it is provided, by the first apparatus, the new session key to at least one apparatus of the at least one new apparatus.

According to a corresponding exemplary embodiment of the methods according to the first and second exemplary aspect of the invention, if the expiration date associated with the session key is expired and there are changes of the membership in the group, the new session key is determined, by the first apparatus, based on:
(i) providing, by the first apparatus, at least one message to at least one further apparatus of at least one further apparatus, wherein each of the at least one message comprises a key information of the first apparatus and is associated with the first identifier associated with the first apparatus, and
(ii) determining, by the first apparatus, the new session key of the communication session associated with the first apparatus and the at least one further apparatus, based on at least one message received, by the first apparatus, provided by at least one further apparatus of the at least one further apparatus, wherein each of the at least one message comprises a key information of the respective further apparatus and is associated with a first identifier associated with the respective further apparatus, wherein the first apparatus and the at least one further apparatus are members of the group after the membership in the group has changed.

Thus, the first exemplary aspect of the invention may be used to determine the new session key for the communication session of the group, e.g. as explained with respect to the above mentioned example embodiments.

According to a corresponding exemplary embodiment of the methods according to the first and second exemplary aspect of the invention, it is provided, by the first apparatus, a hash value based on the determined new session key to a central network instance.

According to a corresponding exemplary embodiment of the methods according to the first and second exemplary aspect of the invention, it is received, by the first apparatus, an activation message provided by the central network instance.

According to a corresponding exemplary embodiment of the methods according to the first and second exemplary aspect of the invention, secure communication with one or more apparatuses of the apparatuses of the group is performed based on the determined new session key.

According to a corresponding exemplary embodiment of the methods according to the second exemplary aspect of the invention, said information further comprises at least one of: (i) a set of system parameters, and/or (ii) the private key SKi, and/or (iii) a public key PKi associated with the apparatus, wherein the private key may correspond to the private key.

According to a corresponding exemplary embodiment of the methods according to the second exemplary aspect of the invention, the set of system parameters comprises at least one of: (i) a first hash function, and/or (ii) a second hash function, and/or (iii) a third hash function, and/or (iv) a generator g, and/or (iv) a function e associated with bilinear pairing, and/or (v) a systems public key.

According to a corresponding exemplary embodiment of the methods according to the second exemplary aspect of the invention, the at least one apparatus is configured to perform the method according to the second exemplary aspect of the invention for each apparatus of the set of apparatuses.

According to a corresponding exemplary embodiment of the methods according to the second exemplary aspect of the invention, the methods comprise (i) receiving a group session request message from each apparatus of the set of apparatuses, (ii) obtaining a session identifier associated with the communication session associated with the set of apparatuses, (iii) determining an ordered structure of the apparatuses of the set of apparatuses, (iv) providing group information to each apparatus of the set of apparatuses.

According to a corresponding exemplary embodiment of the methods according to the second exemplary aspect of the invention, said group information comprises an ordered list of pseudonyms and the session identifier. For instance, said ordered list of pseudonyms may comprise the ordered first identifier associated with the at least one further apparatus.

According to a corresponding exemplary embodiment of the methods according to the second exemplary aspect of the invention, the methods comprise, for each apparatus of the set of apparatuses, receiving a respective hash value based on the session key determined by the respective apparatus of the set of apparatuses, and checking, whether all hash values based on the session key are the same, and if this checking yields a positive result, activating the communication session.

According to a corresponding exemplary embodiment of the methods according to the second exemplary aspect of the invention, the first apparatus and the at least one further apparatus represent a group associated with the communication session, the method comprises, receiving a message being indicative of a change of the membership in the group from an apparatus.

According to a corresponding exemplary embodiment of the methods according to the second exemplary aspect of the invention, if said change of the membership comprises revocation from at least one apparatus of the apparatuses of the group, updating the group by removing said at least one apparatus from the group.

According to a corresponding exemplary embodiment of the methods according to the second exemplary aspect of the invention, if said change of the membership comprises at least one new apparatus joining the group, updating the group by adding the at least one new apparatus to the group.

According to a corresponding exemplary embodiment of the methods according to the second exemplary aspect of the invention, the method comprises: (i) determining an ordered structure of the apparatuses of the group after change of the membership in the group, (ii) providing group information to each apparatus of the groups.

According to a corresponding exemplary embodiment of the methods according to the second exemplary aspect of the invention, said group information comprises an ordered list of pseudonyms and the session identifier.

According to a corresponding exemplary embodiment of the methods according to the second exemplary aspect of the invention, if said change of the membership comprises at least one new apparatus joining or willing to join the group, the method comprises for each of said at least new apparatus: (i) determining a first identifier associated with the apparatus, wherein this apparatus is associated with a second identifier of the apparatus, (ii) determining a private key associated with the apparatus, (iii) providing information to the apparatus comprising the first identifier of the apparatus.

According to a corresponding exemplary embodiment of the methods according to the second exemplary aspect of the invention, a random value is determined and the random value is provided to at least one apparatus the apparatuses of the group.

According to a corresponding exemplary embodiment of the methods according to the second exemplary aspect of the invention, it is received, for each apparatus of the group, a respective hash value based on the new session key determined by the respective apparatus of the group, and it is checked, whether all hash values based on the session key are the same, and if this checking yields a positive result, the communication session is activated.

According to a fifth exemplary aspect of the invention a computer program code is disclosed, the computer program code when executed by a processor causing an apparatus to perform the actions of the method of any one of the methods of the first, second and third exemplary aspects of the invention.

According to an exemplary embodiment of the fifth exemplary aspect of the invention, furthermore a computer readable storage medium is disclosed, in which computer program code according to the fifth exemplary aspect of the invention is stored.

The features and example embodiments of the invention described above may equally pertain to the different aspects according to the present invention.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 1 is a schematic block diagram of an example embodiment of any at least one apparatus according to the invention. Apparatus 100 comprises a processor 101 and, linked to processor 101, a memory 102. Memory 102 stores computer program code for (i) obtaining a first identifier associated with a first apparatus, wherein the first identifier is different from a second identifier associated with the first apparatus, (ii) providing at least one message to at least one further apparatus of at least one further apparatus, wherein each of the at least one message comprises a key information of the first apparatus and is associated with the first identifier associated with the first apparatus, and (iii) determining a session key of a communication session associated with the first apparatus and the at least one further apparatus, based on at least one message received, by the first apparatus, provided by at least one further apparatus of the at least one further apparatus, wherein each of the at least one message comprises a key information of the respective further apparatus and is associated with a first identifier associated with the respective further apparatus. Processor 101 is configured to execute computer program code stored in memory 102 in order to cause an apparatus to perform desired actions. Memory 102 is thus an example embodiment of a non-transitory computer readable storage medium, in which computer program code according to the invention is stored.

Figure 1:
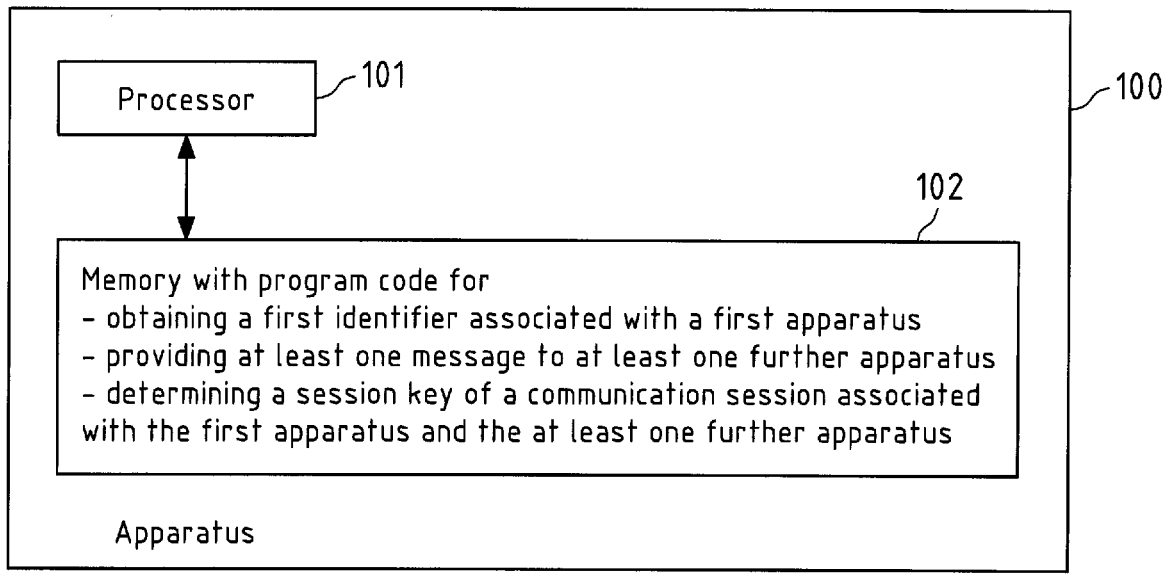
FIG. 1 is a schematic block diagram of an example embodiment of at least one apparatus according to a first exemplary aspect of the invention.

Apparatus 100 could be a terminal or any other kind of mobile or stationary device, wherein the apparatus 100 may represent a User Equipment (UE) of mobile communication network.

Apparatus 100 could equally be a component, like a chip, circuitry on a chip or a plug-in board, for any terminal or mobile or stationary device. Optionally, apparatus 100 could comprise various other components, like a data interface configured to enable an exchange of data with separate devices, a user interface like a touchscreen, a further memory, a further processor, etc.

An operation of at least one apparatus will now be described with reference to the flow chart of FIG. 2. The operation is an example embodiment of a method according to the invention. At least one processor 101 (may be one processor 101 or a plurality of processors 101) and the program code stored in at least one memory 102 (may be one memory 102 or a plurality of memories 102) cause an apparatus to perform the operation when the program code is retrieved from memory 102 and executed by processor 101. The apparatus that is caused to perform the operation can be apparatus 100 or some other apparatus, for example but not necessarily a device comprising apparatus 100.

The apparatus 100 may be considered to represent a first apparatus. The first apparatus 100 is configured to obtain a first identifier associated with the first apparatus, wherein the first identifier is different from a second identifier associated with the first apparatus (action 210).

For instance, the second identifier may be a representative of a real identity of the first apparatus 100, wherein, as an example, this real identity may be a real identify of the first apparatus in a communication network. E.g., said real identifier may be one of IMSI or GUTI or IMEI code, wherein said real identifier may be registered at a central network instance. Furthermore, as an example, the first identifier may represent a private identifier or anonymized identifier or a pseudonym for the first apparatus, wherein, as an example, the first identifier may be not known to specific entities in the communication network.

As an example, in addition to the first apparatus there may be at least one further apparatus associated with the same communication network as the first apparatus. For instance, each of the at least one further apparatus may represent a further apparatus of type of the first apparatus mentioned above, i.e., each of the at least one further apparatus there may be associated with a first identifier, wherein the first identifier may represent a private identifier or anonymized identifier or a pseudonym for the respective further apparatus, and may be associated with a second identifier, wherein the second identifier may be a representative of a real identity of the respective further apparatus. Then, for instance, the second identifier of the first apparatus is not known to any of the at least one further apparatus, and, vice versa, the second identifier of each of the at least one further apparatus is not known to any other apparatuses of the set of first apparatus and the at least one further apparatus. Accordingly, privacy may be achieved between the first apparatus and each of the at least one further apparatus since the second identifier of an apparatus is not known to the other apparatus.

For instance, obtain the first identifier may comprise generating the first identifier, e.g. based on an calculation rule or based on a random number, or may comprise reading the first identifier from a memory of the first apparatus 100 and/or receiving the first identifier by the first apparatus 100 from another entity, e.g. from a central network instance or any other apparatus.

The first apparatus 100 is configured to provide at least one message to at least one further apparatus of at least one further apparatus, wherein each of the at least one message comprises a key information of the first apparatus and is associated with the first identifier associated with the first apparatus (action 220). As an example, a message of said at least one provided message may be denoted as $M_i$.

For instance, the at least one further apparatus may represent the above mentioned at least one further apparatus associated with a same communication network as the first apparatus. Then, the message is provided to at least one further apparatus of this at least one further apparatus. The first apparatus and the at least one further apparatus may be configured to join a communication, e.g. through said communication network, wherein this communication may represent a Device-to-Device (D2D) communication. For instance, said first apparatus and the at least one further apparatus may be considered as a set of apparatuses. As an example, this D2D communication may be implemented by means of a direct path communication or a local path between two apparatuses of the set of apparatuses. For instance, in case of direct path communication between two apparatuses there is no intermediary between these two apparatuses, and, e.g., in case of local path communication between the apparatuses the communication may be performed via at least one node. The D2D communication may comprise proximity services (ProSe) of a mobile network, e.g. of 3GPP or of other mobile networks. Proximity services may refer to services that may be invoked when apparatus are within a physical proximity of each other, but, as another example, proximity services may also be applied by two apparatuses that are not physically close to each other. Furthermore, for instance, a D2D communication may represents a communication being under the control of a central network instance, wherein the central network instance may represent an Access Point (AP), or a Base Station (BS), or a Core Network (CN), or at least one eNodeB (EnB) or any other well-suited representation of a central network instance. Thus, the D2D communication between apparatuses of the set of apparatus may be assumed to be under control of the central network instance.

For instance, a key information in one or more messages provided by first apparatus 110 may represent any key information which can be used to generate and/or negotiate a session key based on a mutual communication together with the at least one further apparatus. For instance, said key information may represent a key hint, which may be determined based on a random number and, as an example, on a generator g of a cyclic multiplicative group G which may be configured to be used for bilinear pairing.

Each message of the at least one message provided by the first apparatus 100 is associated with the first identifier of the first apparatus 100. For instance, the message may comprise the first identifier or the first identifier. For instance, a first message of the at least one message comprise the key hint and is provided by the first apparatus 100 to at least one further apparatus of the at least one further apparatus, wherein, as an example, this first message may be provided to one further apparatus of the at least one further apparatus, or, if the at least one further apparatus represent two or more further apparatus, to two further apparatus of the two or more apparatuses or to more than two further apparatus of the two or more apparatuses. This providing the first message to the at least one further apparatus of the at least one further apparatus may be performed based on a D2D communication between the first apparatus and the at least one further apparatus, but it may be performed via another communication. This communication may represent a secure communication.

Thus, for instance, each message of the at least one message provided by the first apparatus 100 does not comprise the second identifier of the first apparatus 100, which may represent the real identifier of the first apparatus 100. Accordingly, since only the first identify is used for identifying apparatus 100 as origin of each message of the at least one message provided by the first apparatus 100, the at least one further apparatus of at least one further apparatuses to which a message of this at least one message is provided is not able to discover the real identify of the first apparatus 100 and therefore privacy of the first apparatus 100 may be ensured for communication between the first apparatus and each of the at least one further apparatuses. For instance, at least one or each message of the at least one message provided by the first apparatus 100 may not comprise the second identifier of the first apparatus 100. Thus, as an example, privacy during D2D communication between the first apparatus and the at least one further apparatus may be ensured and/or enabled due to usage of the first identifier.

Providing a message from the first apparatus 100 to a further apparatus of the at least one further apparatus may comprise transmitting the message from the first apparatus 100 to the respective further apparatus, wherein this transmission of the message may be performed directly between the first apparatus and the respective further apparatus or may be performed via at least one node, wherein, for instance, this at least one node mode may comprise another at least one further apparatus (e.g. of the set of apparatus) and/or, as an example, a network instance. As an example, this definition of providing a message may hold for any providing a massage or information in this application.

The first apparatus 100 is configured to determine a session key of a communication session associated with the first apparatus and the at least one further apparatus, based on at least one message received, by the first apparatus 100, provided by at least one further apparatus of the at least one further apparatus, wherein each of the at least one message comprises a key information of the respective further apparatus and is associated with a first identifier associated with the respective further apparatus (action 230). As an example, the communication session may represent the above mentioned D2D communication. This receiving at least one message by the first apparatus 100 provided by at least one further apparatus may be performed based on a D2D communication between the first apparatus and each apparatus of the at least one further apparatus, but it may be performed via another communication. This communication may represent a secure communication.

Each message of at least one message received by the first apparatus 100 comprises a key information of the respective further apparatus which has provided this message. For instance, this message may comprise a key hint associated with this respective further apparatus.

As an example, the at least one message received by the first apparatus 100 may represent one message, or, if the at least one further apparatus represents two or more further apparatus, the at least one message received by the first apparatus 100 may represent two messages provided by two different further apparatus of the two or more further apparatus or may present more than two messages provided by more than two different further apparatus of the two or more further apparatus.

Thus, the first apparatus 100 receives at least one key information received in said at least one message. Based on this received at least one key information, and, for instance, based on the key information of the first apparatus 100, the first apparatus determines a session key of a communication session associated with the first apparatus and the at least one further apparatus. For instance, actions 220 and 230 depicted in FIG. 2 may represents parts of session key negotiation procedure between the first apparatus and the at least one further apparatus, wherein this session key negotiation procedure may be used to adapt a group key agreement to negotiate the session key, which might be assumed to represent a common group session key among all apparatus of the set of apparatus comprising the first apparatus and the at least one further apparatus.

Each message of the at least one message received by the first apparatus 100 in action 230 is associated with a first identifier of the associated with the respective further apparatus which has provided the message. For instance, a received message may comprise the first identifier associated with the respective further apparatus which as provided the message.

As an example, each further apparatus of the at least one further apparatuses may be associated with a first identifier and a second identifier, wherein the second identifier is different from this first identifier. For instance, the second identifier of a further apparatus of the at least one further apparatus may be a representative of a real identity of the respective further apparatus, wherein, as an example, this real identity may be a real identify of the further apparatus in a communication network. E.g, said real identifier may be one of IMSI or GUTI or IMEI code, wherein said real identifier may be registered at a central network instance. Furthermore, as an example, the first identifier may represent a private identifier or anonymized identifier or a pseudonym for the respective further apparatus, wherein, as an example, the first identifier may be not known to specific entities in the communication network. In particular, a second identifier of an apparatus of the set of apparatuses may be not known to other apparatus of the set of apparatuses.

Thus, for instance, the first apparatus which receives the at least one message in action 230 may not be aware of the real identity of any of the at least one further apparatuses since, for each of the received message (action 230) only the first identifier associated with the respective further apparatus which has provided the respective message is known to the first apparatus, but not the second identifier associated with the respective further apparatus which has provided the respective message.

Thus, negotiating the session key can be performed in privacy between the apparatuses of the set of apparatus since the apparatuses of the set of apparatuses do not have to exchange their second identities. Accordingly, privacy between the apparatus of the set of apparatuses can be achieved and/or enabled.

For instance, the first identifier may be denoted as $PID_i$ for the ith apparatus of the set of apparatus comprising the first apparatus and the at least one further apparatus.

In an example embodiment, the first apparatus 100 is associated with a public key, wherein the public key can be determined based on the first identifier associated with the first apparatus and a first hash function.

The first hash function may represent a cryptographic has function. For instance, the first hash function may be denoted as $H_1$.

For instance, the public key of the first apparatus may be denoted as PK, wherein, for instance, each of the apparatus of the set of apparatus may be associated with a respective public key $PK_i$, wherein $PK_i$ denotes the public key of the ith apparatus of the set of apparatuses. Furthermore, as an example, the same first hash function may be used for determining $PK_i$ based on the first identifier $PID_i$ associated with the ith apparatus of the set of apparatuses.

As an example, the public key $PK_i$ of an ith apparatus of the set of apparatuses may be determined based on the first identifier $PID_i$ associated with the ith apparatus, e.g. based on $PK_i=H_1(PID_i)$.

The first hash function may represent any well-suited hash function.

Furthermore, as an example, the first apparatus 100 may be associated with a private key, wherein the private key and the public key associated with the first apparatus 100 may represent key pair. For instance, each apparatus of the set of apparatus may be associated with a public key $PK_i$ and private $SK_i$, wherein $SK_i$ denotes the private key of the respective ith apparatus of the set of apparatuses, wand wherein a public key $PK_i$ and private $SK_i$ associated ith the same ith apparatus may represent a key pair.

Accordingly, the first identifier $PID_i$ associated with the ith apparatus of the set of apparatuses can be used as a basis for determining the public key $PK_i$ of the respective ith apparatus, and thus, the second identifier of the ith apparatus is not necessary of determining the public key $PK_i$. Therefore, privacy can still be maintained even if another apparatus of the set of apparatuses has to determine the public key $PK_i$ of an ith apparatus of the set of apparatuses.

For instance, method 200 may considered to represent a method 200 for negotiating and/or determining the session key associated with the communication session of the first apparatus und the at least one further apparatus, wherein a set of apparatuses may comprise the first apparatus and the at least one further apparatus.

The public key $PK_i$ can be used for mutual authentication between the first apparatus and a further apparatus of the at least one further apparatus, and, for instance, it can be used for mutual authentication between different apparatus of the set of apparatuses.

Figure 3A:
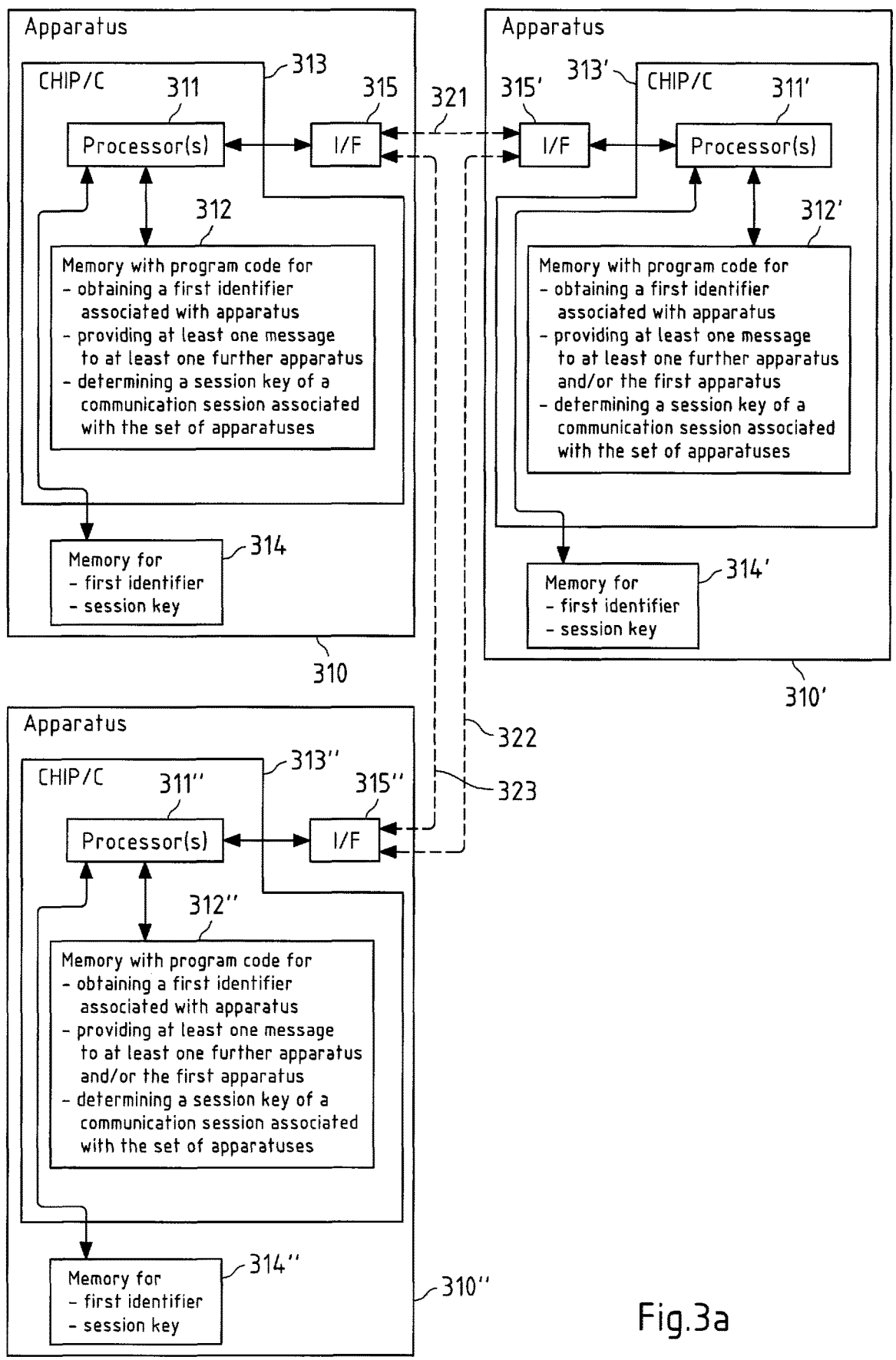
FIG. 3a is a schematic block diagram of a first example embodiment of system comprising an example apparatus according to the invention.

FIG. 3a depicts a schematic block diagram of a first example embodiment of system 300 comprising at least one example apparatus according to the invention.

The system comprises an apparatus 310 which may comprise the apparatus 100 depicted in FIG. 1. Furthermore, the system comprises at least one further apparatus 310', 310". It has to be noted that in this example depicted in FIG. 3a two further apparatuses 310' and 310" are shown, but there may be only one further apparatus 310' or more than two further apparatuses 310' and 310". The first apparatus 310 and the at least one further apparatus 310', 310" are considered to represent the set of apparatuses 310, 310', 310".

The first apparatus 310 comprises a processor 311 that is linked to a first memory 312, to a second memory 314 and to a communication interface 315. Processor 311 is configured to execute computer program code, including computer program code stored in memory 312, in order to cause the first apparatus 310 to perform desired actions.

Figure 2:
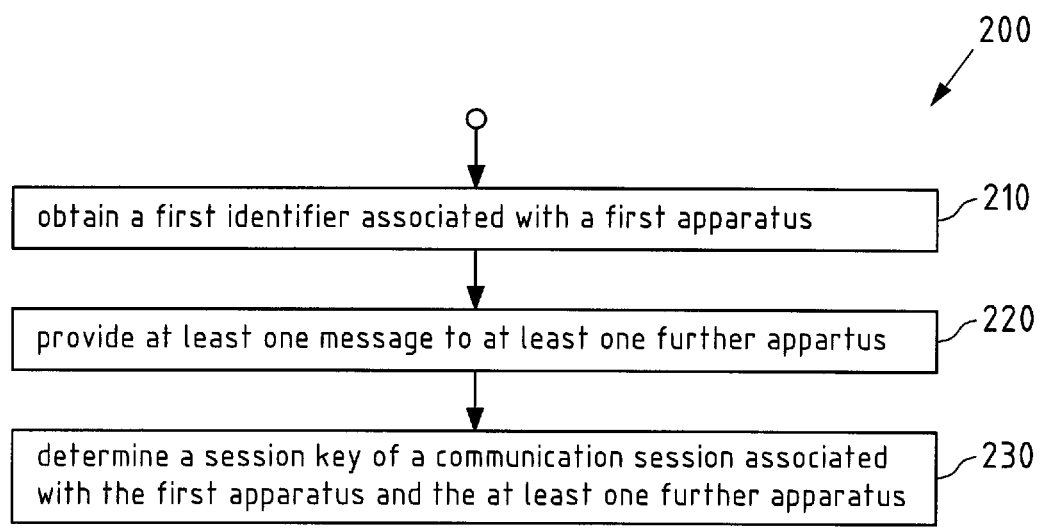
FIG. 2 is a flow chart illustrating an example operation in the at least one apparatus of FIG. 1.

Memory 312 stores computer program code for obtaining a first identifier associated with the first apparatus 310, wherein the first identifier is different from a second identifier associated with the first apparatus, wherein this may correspond to action 210 depicted in FIG. 2. Furthermore, memory 312 stores computer program code for providing at least one message to at least one further apparatus 310', 310" of the at least one further apparatus 310', 310", wherein each of the at least one message comprises a key information of the first apparatus and is associated with the first identifier associated with the first apparatus, wherein this may correspond to action 220 depicted in FIG. 2. Furthermore, memory 312 stores computer program code for determining a session key of a communication session associated with the first apparatus 310 and the at least one further apparatus 310', 310" (i.e., with the set of apparatuses 310, 310', 310'), based on at least one message received, by the first apparatus 310, provided by at least one further apparatus 310', 310" of the at least one further apparatus 310', 310", wherein each of the at least one message comprises a key information of the respective further apparatus 310', 311" and is associated with a first identifier associated with the respective further apparatus 310', 311', wherein this may correspond to action 230 depicted in FIG. 2. The computer program code may comprise for example similar program code as memory 102. In addition, memory 312 could store computer program code configured to realize other functions. In addition, memory 312 could also store other kind of data.

Processor 311 and memory 312 may optionally belong to a chip or an integrated circuit 313, which may comprise in addition various other components, for instance a further processor or memory. It may comprise for instance a working memory for processor 311. Memory 314 is configured to store data, for example, the first identifier of the first apparatus 310' and/or the session key of the communication session after it has been generated. Furthermore, other data may be stored in memory 314, e.g. memory 314 may be configured to store data and/or messages received from at least one further apparatus 310' and 310" of the at least one further apparatus 310', 310".

For instance, each further apparatus 310' of the at least one further apparatus 310', 310" may basically correspond to the first apparatus 310, wherein each apparatus 310, 310', 310" of the set of apparatuses 310, 310', 310" may be associated with a different first identifier associated with the respective apparatus 310, 310', 310". Thus, each further apparatus 310', 310" may comprise a processor 311', 311" that is linked to a first memory 312', 312", to a second memory 314', 314" and to a communication interface 315, wherein the processor 311', 311" may correspond to processor 311 of the first apparatus 310, and wherein the first memory 312, 312" may correspond to the first memory 312 of the first apparatus 310, and wherein the second memory 314', 314" may correspond to the second memory 34 of the first apparatus 310.

Memory 312', 312" of one or each of the further apparatus 310', 310" stores computer program code for obtaining a first identifier associated with respective further apparatus 310', 310", wherein the first identifier is different from a second identifier associated with the respective further apparatus 310', 310", wherein this may correspond to action 210 depicted in FIG. 2 (expect for replacing the first apparatus in action 210 with the respective further apparatus). Furthermore, memory 312', 312" stores computer program code for providing at least one message to at least one further apparatus 310', 310" and/or the first apparatus 310, wherein each of the at least one message comprises a key information of the first apparatus and is associated with the first identifier associated with the first apparatus, wherein this may correspond to action 220 depicted in FIG. 2 (expect for replacing the first apparatus in action 210 with the respective further apparatus). Furthermore, memory 312', 312" stores computer program code for determining a session key of a communication session associated with the first apparatus 310 and the at least one further apparatus 310', 310" (i.e., with the set of apparatuses 310, 310', 310'), based on at least one message received, by the first apparatus 310, provided by at least one further apparatus 310', 310" of the at least one further apparatus 310', 310", wherein each of the at least one message comprises a key information of the respective further apparatus 310', 311" and is associated with a first identifier associated with the respective further apparatus 310', 311', wherein this may correspond to action 230 depicted in FIG. 2. The computer program code may comprise for example similar program code as memory 102. In addition, memory 312 could store computer program code configured to realize other functions. In addition, memory 312 could also store other kind of data.

Said first apparatus 310 and the at least one further apparatus 310', 310" may be considered as a set of apparatuses. The first apparatus 310' and the at least one further apparatus 310', 310" may be configured to join a communication, e.g. through said communication network and as indicated by dashed arrows 321, 322, 323 in FIG. 3a, wherein this communication may represent the above mentioned a Device-to-Device (D2D) communication. Thus, the explanations presented with respect to FIGS. 1 and 2 regarding communication between apparatus of the set apparatuses may hold with respect to the communication between apparatus of the set of apparatuses 310, 310', 310" depicted as an example in FIG. 3a.

Thus, negotiating the session key can be performed in privacy between the apparatuses of the set of apparatus 310, 310', 310" since the apparatuses of the set of apparatuses do not have to exchange their second identities. Accordingly, privacy between the apparatus of the set of apparatuses can be achieved and/or enabled.

Figure 3B:
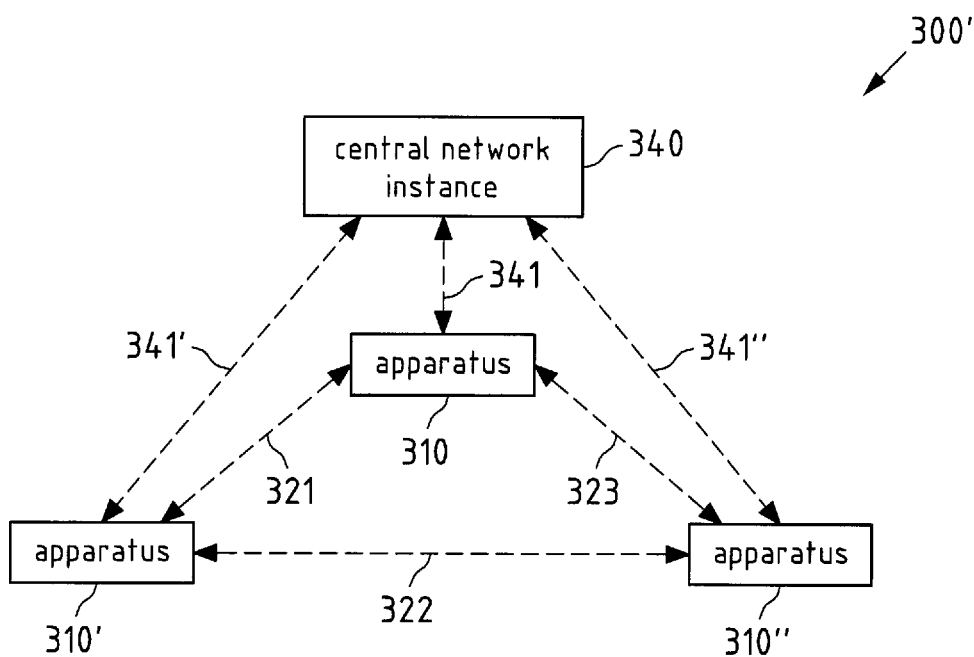
FIG. 3b is a schematic block diagram of a second example embodiment of system comprising an example apparatus according to the invention.

FIG. 3b depicts a schematic block diagram of a second example embodiment of system 300' representing an example of the system 300 depicted in FIG. 3a. The system 300' comprises the first apparatus 310 and the at least one further apparatus 310', 310" of FIG. 3a and, in addition to the example of system 300 of FIG. 3 a, a central network instance 340, wherein this central network instance 340 may represent the central network instance described with respect to FIGS. 1 and 2, i.e., the explanations given above with respect to the central network instance and first apparatus and the at least one further apparatus in view of the examples in FIGS. 1 and 2 also hold for the central network instance 340 and the first apparatus 310 and the at least one further apparatus 310', 310" of system 300'.

The central network instance 340 may represent an Access Point (AP), or a Base Station (BS), or a Core Network (CN), or at least one eNodeB (EnB) or any other well-suited representation of a central network instance. Thus, for instance, a D2D communication between apparatuses of the set of apparatus may 310, 310', 310" be assumed to be under control of the central network instance 340. For instance, the central network instance 340 may be represented by a single apparatus of by a plurality of apparatuses, wherein, of it is represented by a plurality of apparatuses, different actions of the methods described with respect to the central network instance 340 may be performed by different apparatuses of the plurality of apparatuses.

For instance, the set of apparatuses 310, 310', 310" may comprise n apparatuses, wherein n is an integer number $\geq 2$. Furthermore, as an example, the n apparatuses may be arranged in a ring structure, wherein apparatus i−1 and apparatus i+1 may be arranged respectively left and right neighbors of apparatus i for $1 \leq i \leq n$, and wherein apparatus 0 is assumed to be apparatus n and apparatus n+1 is assumed to be apparatus 1. For instance, an ith apparatus of the set of n apparatuses may be denoted as $UE_i$.

In an example embodiment, the first apparatus 310 may be configured to sign each message of at least one message of the at least one message provided to at least one further apparatus 310', 310" of the at least one further apparatus 310', 310" in action 210.

For instance, one or each of the at least one further apparatus 310', 310" may configured to sign each message of at least one message of the at least one message provided to at least one further apparatus 310', 310" and/or to the first apparatus 100.

Figure 4:
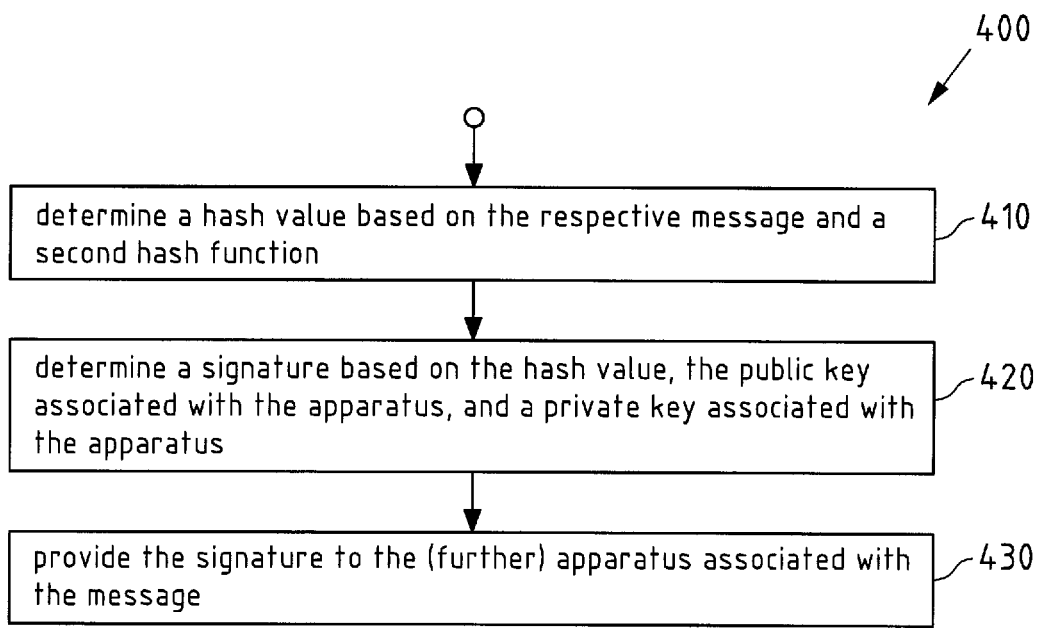
FIG. 4 is a flow chart illustrating a first example embodiment of methods according to a first exemplary aspect of the invention.

FIG. 4 depicts a flow chart illustrating of a first example embodiment of a method 400 according to the invention. This method 400 may be used by the first apparatus 100, 310' to sign a message of at least one message of the at least one message provided by the first apparatus to least one further apparatus 310', 310" of the at least one further apparatus 310', 310", e.g. in action 210, and/or by one or each of the at least one further apparatus 310', 310" in order to sign each message of at least one message of the at least one message provided by the respective further apparatus 310', 310" to at least one further apparatus 310', 310" and/or to the first apparatus 100. For instance, method 400 may be applied for each message of least one message of the at least one message provided by the first apparatus to least one further apparatus 310', 310" of the at least one further apparatus 310', 310" in action 210 and/or for each message of at least one message of the at least one message provided by the respective further apparatus 310', 310" to at least one further apparatus 310', 310" and/or to the first apparatus 100.

This method 400 will now be explained without any limitations with respect to the first apparatus 100, 310, but it can also be applied to one or each apparatus of the at least one further apparatus 310', 310".

A hash value is determined based on the respective message (i.e., the message to be provided by the first apparatus) and a second hash function (action 410). For instance, the respective message may be denoted as $M_i$, the hash value may be denoted as $h_i$ and the second hash function may be denoted as $H_2$.

As an example, the hash value $h_i$ may be calculated by $h_i=H_2(M_i)$ or by $h_i=H_2(M_i, X_i)$, wherein $X_i$ may represent the key information of the apparatus i which provides or has provided the message $M_i$.

A signature is determined based on the hash value $h_i$, the public key $PK_i$ and the private key $SK_i$ associated with the apparatus (action 420), wherein the signature may be denoted as $\sigma_i$.

For instance, the signature $\sigma_i$ may be calculated by apparatus i as follows:

Determine $V_i=PK_i^{x_i} \cdot SK_i^{h_i}$, and determine $\sigma_i=(V_i)$ or determine $\sigma_i=(X_i, V_i)$ As an example, $x_i$ denotes a random number associated with the ith apparatus and which may have been generated by the ith apparatus. This random number $x_i$, wherein $x_i \in Z^*_q$ may hold, may be used to obtain a first key hint which might be transmitted in message $M_i$ as key information. For instance this first key hint associated with the ith apparatus may be represented by $X_i$ and may be calculated based on a generator g of a bilinear pairing. As an example, the message $M_i$ comprising the first key hint $X_i$ may be considered to represent a first message of the at least one message provided by the apparatus (e.g. during action 210 in FIG. 2).

Furthermore, as an example, the first message $M_i$ may further comprise, in addition to the first key hint $X_i$ and the first identifier of the respective ith apparatus (i.e., apparatus $UE_i$) at least one of an session identifier $SID_I$, wherein the session identifier $SID_I$ identifies the communication session associated with the set of apparatuses, and/or an parameter indicating that message $M_i$ is of type first message comprising the first key hint, wherein this parameter may be a "1".

For instance, according to such a bilinear paring, let G and $G_T$ be two cyclic multiplicative groups with the same prime order q. Discrete logarithm problem (DLP) may be assumed to be hard in both G and $G_T$. Let g and $g_1$ be two generators of G and $G_T$ respectively. Let us have a bilinear map e: $G \times G \to G_T$, with the following properties:

Bilinear: For all $R,S \in G$ and a, $b \in \mathbb{Z}^*_q$, $e(R^a, S)^b = e(R, S)^{ab}$;

Nondegenerate: There exist $R,S \in G_1$ such that $e(R,S) \neq 1_{G_2}$;

Computable: There is an efficient algorithm to compute $e(R, S')$ for any $R,S \in G_1$.

Then, the bilinear map e can be constructed by the modified Weil or Tate pairings on the elliptic curves, e.g. as described in W. Diffie and M. Hellman, "New directions in cryptography," IEEE Transactions on Information Theory, vol. IT-22, no. 6, pp. 644-654, 1976.

As an example, the first key hint $X_i$ may be calculated based on the generator g and the random number $x_i$ by the following example equation: $X_i=g^{x_i}$ The signature $\sigma_i$ is provided by the ith apparatus to the (further) apparatus associated with the message $M_i$. For instance, if the ith apparatus represents the first apparatus 310 then the message $M_i$ is provided to a further apparatus 310', 310" of the at least one further apparatus 310', 310" and the signature $\sigma_i$ is provided by the first apparatus 310 to the apparatus associated with the message $M_i$, i.e. the apparatus which is intended be the recipient of this message $M_i$, i.e. said further apparatus 310', 310" of the at least one further apparatus 310', 310", or, if the ith apparatus may represent one further apparatus 310' of the further apparatus 310', 310" and the message $M_i$ is provided to one of other further apparatus 310" or to the first apparatus 310 (i.e., is provided to one other apparatus 310, 310" of the set of apparatuses 310,310', 310"), the signature $\sigma_i$ is provided by the further apparatus 310' to the apparatus associated with the message $M_i$, i.e. the apparatus which is intended be the recipient of this message $M_i$, i.e. said other apparatus 310, 310" of the set of apparatus 310, 310', 310".

For instance, said signature $\sigma_i$ may be provided by the ith apparatus to recipient of message $M_i$ together with message $M_i$ or separately from message $M_i$.

Thus, this signature $\sigma_i$ may enable authentication of the associated message $M_i$ by the receiving apparatus. Furthermore, privacy of the providing ith apparatus may be achieved since the first identifier is used for this signature.

Figure 5A:
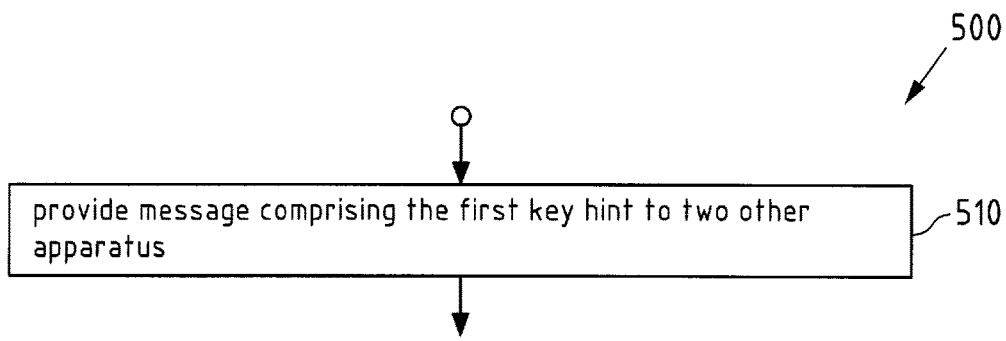
FIG. 5a is a flow chart illustrating a second example embodiment of methods according to a first exemplary aspect of the invention.

FIG. 5a depicts a flow chart illustrating of a second example embodiment of a method 500 according to the invention. For instance, this method 500 may be used to provide, by the first apparatus 100, at least one message of the at least one message to at least one further apparatus, e.g. in accordance with action 210 of FIG. 2.

It is assumed that the at least one further apparatus 310', 310" comprises two or more further apparatus 310', 310".

As an example, the message $M_i$ comprising the first key hint $X_i$ may be considered to represent a first message of the at least one message provided by the apparatus (e.g. during action 210 in FIG. 2). For instance, the first key hint $X_i$ may be determined by the first apparatus based on the generator g and a random value $x_i$, wherein the random value may be determined by the first apparatus, wherein $X_i=g^{x_i}$ may hold. Said providing at least one message to at least one further apparatus of the at least one further apparatus (e.g. according to action 210 of FIG. 2) may comprise providing the first message $M_i$ to two other apparatuses of the set of apparatuses. For instance, the apparatus which provides this first message $M_i$ according to action 210 may represent the ith apparatus (e.g. $UE_i$), wherein $i \in \{1, \ldots, n\}$ may hold, and then, message $M_i$ is provided to apparatus i−1 (e.g. $UE_{i-1}$) and to apparatus i+1 (e.g. $UE_{i-1}$) of the set of n apparatuses.

It may be assumed that the n apparatuses of the set of apparatuses are arranged in a ring structure, wherein apparatus i−1 and apparatus i+1 may be arranged respectively left and right neighbors of apparatus i for $1 \le i \le n$, and wherein apparatus 0 is assumed to be apparatus n and apparatus n+1 is assumed to be apparatus 1.

Figure 5B:
FIG. 5b is a schematic illustration of an example of providing a first message according to a first exemplary aspect of the invention.

Furthermore, according to action 430 of method 400 depicted in FIG. 4, the ith apparatus (e.g. $UE_i$), which provides the first message $M_i$ according to action 510 to two other apparatuses (e.g. to $UE_{i-1}$ and to $UE_{i+1}$) may further provide the signature $\sigma_i$ determined based on the first message $M_i$ according to action 420 to these two other apparatuses $UE_{i-1}$, $UE_{i+1}$, for instance, as depicted as an example in FIG. 5b.

For instance, if the ith apparatus is the first apparatus 310 (e.g. $UE_i$) then, according to method 500, the first message $M_i$ is provided to a first further apparatus 310' (e.g. $UE_{i-1}$) and to a second further apparatus 310'' (e.g. $UE_{i+1}$) of the plurality of further apparatuses.

In an example embodiment, each message of at least one message of the at least one received message may be verified.

Figure 6A:
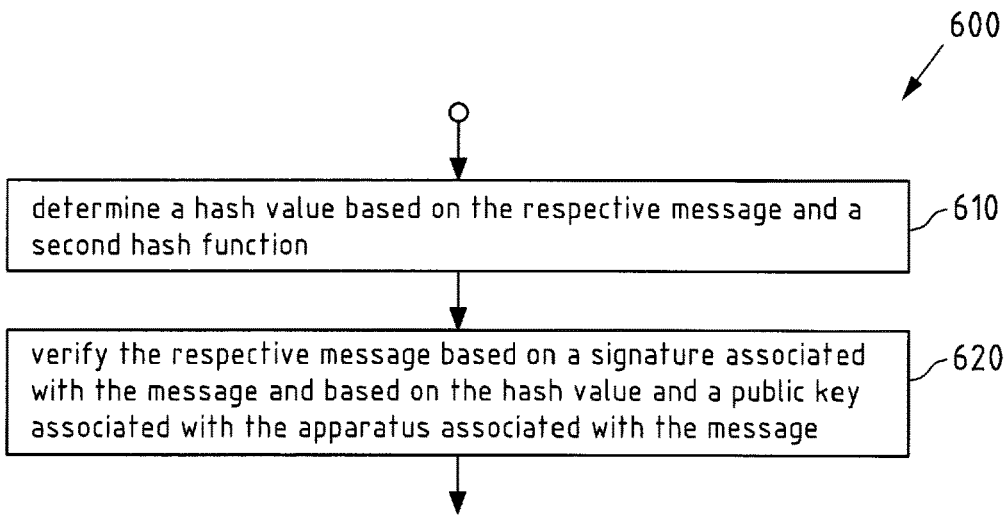
FIG. 6a is a flow chart illustrating a third example embodiment of methods according to a first exemplary aspect of the invention.

FIG. 6a depicts a flow chart illustrating a third example embodiment of a method 600 according to the invention. For instance, this method 600 may be applied in order to verify and/or authenticate each message of at least one message of the at least one message received by the first apparatus 100, 310 in action 210 (or received by one of the at least one further apparatuses 310', 310'').

As an example embodiment, said verifying each message of at least one message of the at least one received message by the apparatus $UE_i$ may comprise for the respective message, if the first identifier $PID_j$ associated with the respective message, wherein $j \in \{1, \ldots, i-1, i+1, \ldots n\}$ holds, comprises an expiration date, checking whether the expiration date is expired, and if this checking yields a positive result (i.e. the date is expired), then discarding method 600 and determine that verification of the message is not successful. Otherwise, method 600 may proceed.

For instance, this method may be performed by an ith apparatus (e.g. UE) of the set of apparatuses 310, 310', 310'', wherein the ith apparatus may represent the first apparatus 100' or one apparatus of the at least one further apparatuses 310', 310''.

A second hash value $h_j$ is determined based on the respective message, i.e. based on the received massage, and on a second hash function $H_2$, wherein the second hash function $H_2$ may be different to the first hash function $H_1$ (action 610). The received message is provided by another apparatus of the set of apparatuses being different from the ith apparatus $UE_i$. For instance, without any limitations, the received message may be provided by apparatus $UE_j$, wherein $j \in \{1, \ldots, i-1, i+1, \ldots n\}$ and, as an example, where j=i−1 or j=i+1 may hold, and wherein the received message may be denoted as MB. As an example, this received message $M_j$ provided by apparatus $UE_j$ may represent a message M comprising the first key hint of this apparatus $UE_j$ provided by apparatus $UE_j$ during action 220 and/or during action 510 depicted in FIG. 5a, and/or may represent one of the messages $M_i$ (wherein label i in FIG. 5b has to be set to j) depicted in FIG. 5b.

For instance, the second hash value $h_j$ may be calculated by $h_j=H_2(MR_j)$ or by $h_j=H_2(M_j, X_j)$, wherein $X_j$ may represent the key information of the apparatus j which provides or has provided the message $M_j$.

Then, in action 620, the respective received message is verified by the based on a signature $\sigma R_j$ associated with the message $MR_j$ and based on the hash value $h_j$ and based on a public key $PK_j$ associated with the message $MR_j$. For instance, the signature $\sigma R_j$ may represent the signature $\sigma_j$ provided by apparatus $UE_j$ during action 430 in method 400 and/or may represent one of the signatures $\sigma_i$ depicted in FIG. 5b (wherein label i in FIG. 5b has to be set to j). Thus, as an example, the signature $\sigma_j$ may be received at apparatus $UE_i$ together with message $M_j$ or separately from message $M_j$.

For instance, apparatus $UE_i$ may determine the public key $PK_j$ associated with message $MR_j$ and thus associated with apparatus $UE_j$, which has provided or which provides the message $MR_j$, based on the first identifier $PID_j$ of the of the apparatus $UE_j$. For instance, this first identifier $PID_j$ may be known to the apparatus $UE_i$ since the n apparatuses of the set of apparatuses 310, 310', 310'' has decided to join the communication session and thus, the first identifiers $PID_i$ of the n apparatuses, where $i \in \{1, \ldots, n\}$ holds, may have been exchanged between the apparatuses of the set of apparatuses 310, 310', 310'', e.g. by communication between the apparatuses of the set of apparatuses (e.g. based on the D2D communication), and/or by communication via the central network instance 340. Thus, each apparatus UE; may know the first identifiers $PID_j$, wherein $j \in \{1, \ldots, i-1, i+1, \ldots n\}$ holds, of the other apparatuses of the set of apparatuses 310, 310', 310''.

As an example, the apparatus $UE_i$ may determine the public key $PK_j$ associated with message $M_j$ based on the first hash function $H_1$ and the first identifier $PID_j$ of the of the apparatus $UE_j$ by means of equation $PK_j=H_1(PID_j)$.

Then, based on the signature $\alpha R_j$ associated with the message $MR_j$ and based on the hash value $h_j$ and based on a public key $PK_j$ associated with the message $MR_j$ apparatus $UE_i$ can verify the received message $MR_j$ (action 620). For instance, if the verification is not successful the key negotiation session may be discarded. Or, as another example, if the verification is successful the key negotiation session may be continued.

Furthermore, this verification may be further based on a system public key, which might be calculated as $P_{pub}=g^s$, wherein g represents the generator of the bilinear pairing and s represents a random number s, wherein $s \in Z^*_q$ may hold, and wherein, as an example, this random number s may be generated by the central network instance 340 and the system public key $P_{pub}$ may be provided by central network instance 340 to at least one apparatus or to each apparatus of the set of apparatuses 310, 310', 310''.

As an example, verifying a respective message in action 620 may be performed jointly for two messages received at apparatus $UE_i$, wherein these two received message may be $MR_j$ with j=i−1, j=i+1. Then, action 610 in method 600 may be performed for each of the two received messages $MR_I$ in order to determine the second hash value $h_j$ of each of the two received messages $MR_j$.

Figure 6B:
FIG. 6b is a schematic illustration of an example of providing and/or receiving a first message according to a first exemplary aspect of the invention.

For instance, as depicted in the example of FIG. 6b, the first received message may represent $M_{i-1}$ and the second received message may represent $M_{i+1}$, each comprising the first key hint $X_j$ of the respective apparatus $UE_j$ (j=i−1 or j=i+1) provided by respective apparatus $UE_j$ during action 220 and/or during action 510 depicted in FIG. 5a, and/or may represent one of the messages $M_i$ (wherein label i in FIG. 5b has to be set to j) depicted in FIG. 5b. Then, as an example, the second hash value $h_j$ may be calculated by $h_j=H_2(M_j)$ or by $h_j=H_2(M_j, X_j)$ for the respective apparatus $UE_j$ (j=i−1 or j=i+1).

Furthermore, as an example, the joint verification of the first received message $M_{i-1}$ and the second received message $M_{i+1}$ in action 620 may be performed as follows (j=i−1, i+1):

$$\underbrace{e\left(g, \sum_j V_j\right)}_{e_l} \Longleftrightarrow^? \underbrace{\prod_j e\left(PK_j, X_j \cdot P_{pub}^{h_j}\right)}_{e_r}$$

If the left side of the equation, denoted as $e_l$, is equal to the right side of the equation, denoted as $e_r$, verification of the two received messages $M_{i-1}$ and $M_{i+1}$ is successful, otherwise it is not successful.

For instance, if the verification is successful, the apparatus $UE_i$ may consider the first key hint $X_j$ of the respective apparatus $UE_j$ (j=i−1 and j=i+1) received in the two messages $M_{i-1}$ and $M_{i+1}$ to be correct.

Figure 7A:
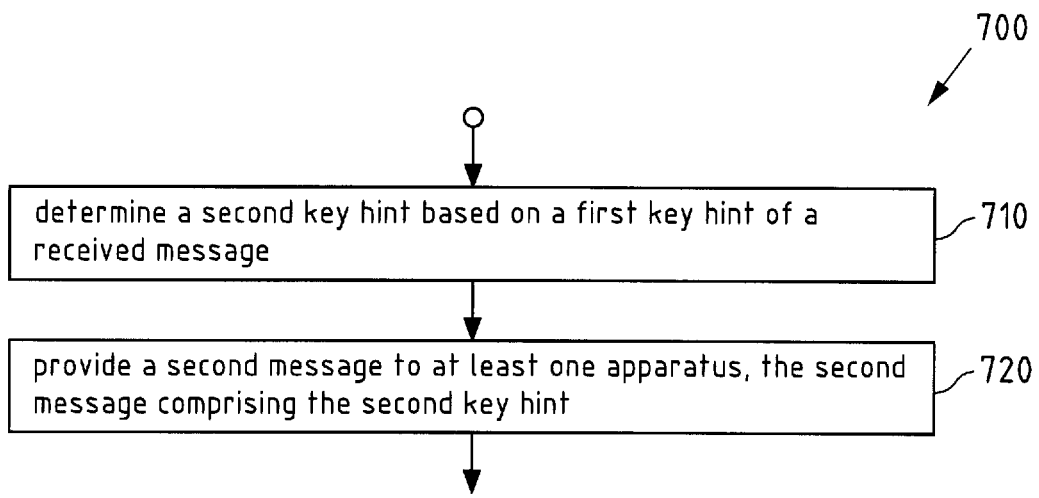
FIG. 7a is a flow chart illustrating a fourth example embodiment of methods according to a first exemplary aspect of the invention.

FIG. 7a depicts a flow chart illustrating of a fourth example embodiment of a method 700 according to the invention. For instance, this method 700 may be used by the first apparatus 100, 310' to provide at least one message of the at least one message to at least one further apparatus of the at least one further apparatus 310', 310" as part of action 220 or this method 700 may be used by one or each of the at least one further apparatus 310', 310" in order to provide at least one message of the at least one message provided by the respective further apparatus 310', 310" to at least one further apparatus 310', 310" and/or to the first apparatus 100, 310.

It is assumed that apparatus $UE_i$, which might represent the above mentioned first apparatus 100, 310 or one of the at least one further apparatus 310', 310", has received at least one first key hint $X_j$ in a message $MR_j$ received from at least one other apparatus $UE_j$, wherein j≠i holds.

Then, apparatus $UE_i$ determines a second key hint $Y_i$ based on at the at least one first key hint $X_j$ received in a message from at least one other apparatus $UE_j$ (action 710). For instance, this second key hint $Y_i$ may be a hint for determining the session key.

As an example, action 710 may comprise determining a first key $K_i^1 = X_{i-1}^{x_j}$ based on the first key hint $X_{i-1}$ of the apparatus $UE_{i-1}$ associated with the first receive message received message $M_{i-1}$, and, optionally, determining a second key $K_i^2 = X_{i+1}^{x_j}$ based on the first key hint of the apparatus $UE_{i+1}$ associated with the second receive message $M_{i+1}$ e.g. as depicted as first received message $M_{i-1}$ and second received message $M_{i+1}$ in FIG. 6b, wherein random number $x_i$ may represent the random number $x_i$ associated with apparatus $UE_i$, and may be associated with the first key hint $X_i$ associated with the $UE_i$, by the generator g: $X_i = g^{x_i}$ As an example, the second key hint $Y_i$ may be determined by $$Y_i = \frac{K_i^1}{K_i^2} \left( \text{or by } Y_i = \frac{K_i^2}{K_i^1} \right).$$

Figure 7B:
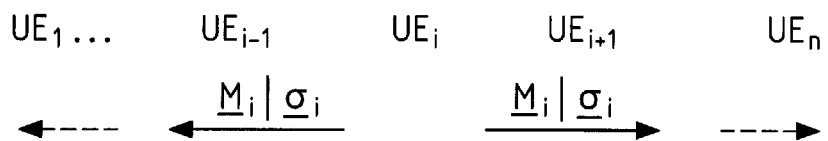
FIG. 7b is a schematic illustration of an example of providing and/or receiving a second message according to a first exemplary aspect of the invention.

Then, apparatus $UE_i$, provides a second message $M_i$ to at least one other apparatus $UE_j$ of the set of apparatuses 310,310',310", wherein j≠i holds, and wherein the second message $M_i$ comprises the second key hint $Y_i$ determined by apparatus $UE_i$. For instance, as an example, this second message $M_i$ may be provided to each other apparatus of the set of apparatuses, i.e., the second message $M_i$ may be provided to each of apparatuses $UE_j$, wherein j∈({1, . . . , i−1, i+1, . . . n} holds. This may be considered to a broadcast of second message $M_i$ from apparatus $UE_i$ to other apparatus of the set of apparatuses, as depicted as an example in FIG. 7b.

Furthermore, as an example, the second message $M_i$, may further comprise, in addition to second key hint $Y_i$ at least one of the session identifier $SID_I$, wherein the session identifier $SID_I$ identifies the communication session associated with the set of apparatuses, and/or an parameter indicating that message $M_i$ is of type second message comprising the second key hint, wherein this parameter may be a "2". Furthermore, the second message $M_i$ may comprise the first identifier $PID_i$.

As an example, method 400 depicted in FIG. 4 may be applied to the second message $M_i$ by apparatus $UE_i$ in order to determine a signature $\sigma_i$ associated with the second message $M_i$.

A hash value $h_i$ is determined based on the respective message $M_i$ (i.e., the second message to be provided by apparatus $UE_i$) and the second hash function (action 410). For instance, the hash value h may be calculated by $h_i=H_2(M_i)$ or by $h_i=H_2(M_i, U_i)$, wherein $U_i$ may be calculated by apparatus $UE_i$ based on a random number $y_i$, wherein $y_i \in Z^*_q$ may hold and wherein $y_i$ may be determined by apparatus $UE_i$ and based on the generator g, e.g. by the following equation:

$$U_i = g^{y_i}$$

As an example, hash value $h_i$ may be determined by apparatus $UE_i$ by calculating $h_i=H_2(M_i, U_i)$. Then, apparatus $UE_i$ determines a signature based on the hash value $h_i$, the public key $PK_i$ associated with apparatus $UE_i$ and the private key $SK_i$ associated with the apparatus $UE_i$ according to action 420, wherein the signature may be denoted as $\sigma_i$.

For instance, the signature $\sigma_i$ may be calculated by apparatus $UE_i$ as follows:

Determine $V_i = PK_i^{y_i} \cdot SK_i^{h_i}$, and determine $\sigma_i = (V_i)$ or determine $\sigma_i = (U_i, V_i)$ Then, for instance, in action 430 the apparatus $UE_i$ provides signature $\sigma_i$ to each apparatus to which the second message $M_i$ is provided. For instance, as indicated as an example in FIG. 7b, the apparatus UE; may provide signature $\sigma_i$ and second message $M_i$ to each other apparatus of the set of apparatuses, i.e., the second message $M_i$ and the signature $\sigma_i$ may be provided to each of apparatuses $UE_j$, wherein j∈{1, . . . , i−1, i+1, . . . n} holds.

Figure 8:
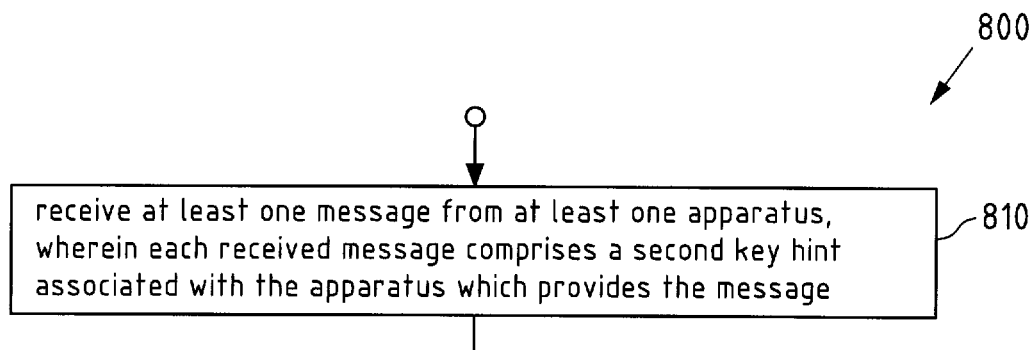
FIG. 8 is a flow chart illustrating a fifth example embodiment of methods according to a first exemplary aspect of the invention.

FIG. 8 depicts a flow chart illustrating a fifth example embodiment of a method 800 according to the invention.

As an example, said at least one message received by the first apparatus 310 (e.g. or received by one of the at least one further apparatus 310', 310") with respect to action 230 are a plurality of receive messages, wherein at least one message of the plurality of receive massages comprises at least one second key hint associated with at least one further apparatus of the at least one further apparatus. For instance, method 800 may be used for receiving said at least one message of the plurality of receive massages, wherein each of the messages comprises a second key hint associated with the apparatus which provides or has provided the respective message.

For instance, the apparatus which receives said at least one message of the plurality of receive massages may represent apparatus $UE_i$, which might represent the above mentioned first apparatus 100, 310 or one of the at least one further apparatus 310', 310". As an example, each of the at least one message received in action 810 may denoted as $MR_j$, wherein j∈{1, ..., i−1, i+1, ... n} holds, and wherein j identifies the apparatus $UE_j$ which has provided or provides the respective message $MR_j$. Furthermore, each of the at least one received messages $MR_j$ comprises the second key hint associated with respective apparatus $UE_j$.

As an example, such a message $MR_j$ may represent the second message $M_j$ provided by the respective apparatus $UE_j$ during action 720 by means of method 700 depicted in FIG. 7a.

For instance, said at least one message received during action 810 may represent n−1 messages, wherein each of the n−1 received messages $M_j$ received by apparatus $UE_i$ is provided (and thus associated with) from a different apparatus $UE_j$ of the other apparatuses of the set of apparatuses than apparatus $UE_i$, i.e., j∈{, ..., i−1, i+1, ... n} holds. Accordingly, apparatus $UE_i$ knows the second key hints of the other apparatuses $UE_j$, wherein j∈{1, ..., i−1, i+1, ... n}.

In an example embodiment, said at least one message received during action 810 may be verified by the respective receiving apparatus $UE_j$. For instance, this verification may be performed based on method 600 depicted in FIG. 6.

For each of said at least one message received during action 810 a second hash value $h_j$ is determined based on the respective message i.e. based on the respective received massage $MR_j$ or $M_j$, and on the second hash function $H_2$, wherein the second hash function $H_2$ may be different to the first hash function $H_1$ (action 610).

For instance, the second hash value $h_j$ may be calculated by $h_j=H_2(MR_j)$ or by $h_j=H_2(M_j, U_j)$, wherein $U_j$ may represent information of the signature $\sigma_j$ of the respective received message $M_j$.

Then, in action 620, the at least one message received during action 810 is verified based on the signature $\sigma_j$ and based on the hash value $h_j$ and based on the public key $PK_j$ associated with each message $MR_j$ of the at least one message received during action 810. For instance, if the verification is not successful the key negotiation session may be discarded. Or, as another example, if the verification is successful the key negotiation session may be continued.

For instance, if the at least one message received during action 810 represents n−1 messages $M_j$ of apparatuses $UE_j$, wherein j∈{1, ..., i−1, i+1, ... n}, and one or more of the public keys $PK_j$ associated with these n−1 apparatuses $UE_j$ are not known by apparatus $UE_i$, the respective public key $PK_j$ can be determined by apparatus $UE_i$ by $PK_j=H_1(PID_j)$, i.e. based on the first hash function $H_1$ and the first identifier $PID_j$ of respective apparatus $UE_j$.

Furthermore, this verification may be further based on the system public key, which might be calculated as $P_{pub}=g^s$, wherein g represents the generator of the bilinear pairing and s represents the random number s, wherein $s\in Z^*_q$ may hold, and wherein, as an example, this random number s may be generated by the central network instance 340 and the random number and/or the system public key P may be provided by central network instance 340 to at least one apparatus or to each apparatus of the set of apparatuses 310, 310', 310".

Furthermore, as an example, the verification of the received n−1 messages $M_j$, wherein j∈{1, ..., i−1, i+, ... n} holds, may be performed as follows:

$$\underbrace{e\left(g, \sum_{j=1/j\neq i}^{n} U_j\right)}_{e_l} \Longleftrightarrow^? \underbrace{\prod_{j=1/j\neq i}^{n} e\left(PK_j, U_j \cdot P_{pub}^{h_j}\right)}_{e_r}$$

If the left side of the equation, denoted as $e_l$, is equal to the right side of the equation, denoted as $e_r$, verification of the at least one (i.e. n−1) received messages $M_j$, wherein j∈{1, ..., i−1, i+1, ... n} holds, is successful, otherwise it is not successful.

For instance, if the verification is successful, the apparatus $UE_i$ may consider the second key hint $Y_j$ in each of the received messages $M_j$, wherein j∈{1, ..., i−1, i+1, ... n} holds, to be correct.

Figure 9:
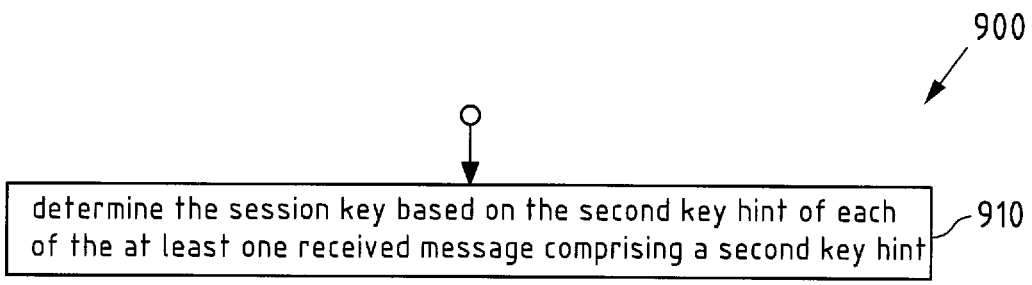
FIG. 9 is a flow chart illustrating a sixth example embodiment of methods according to a first exemplary aspect of the invention.

FIG. 9 depicts a flow chart illustrating a sixth example embodiment of a method 900 according to the invention.

As an example embodiment, the session key is determined by apparatus $UE_i$ based on the second key hint of each message of the at least one received message comprising a second key hint (action 910), e.g., based on the second key hint of each message $MR_j$ or $M_j$ received during action 810. Thus, action 910 of method 900 may represent an example implementation of action 230 of method 200 depicted in FIG. 2.

For instance, it may be assumed that in action 810 n−1 messages $MR_j$ or $M_j$ of the other apparatuses $UE_j$, wherein j∈{1, ..., i−1, i+1, ... n}, are received, wherein each message $MR_j$ or M comprises a respective second key hint $Y_j$.

For instance, this determining the session may be further based on one of the first key $K_i^1$ and the second key $K_i^1$ associated with apparatus $UE_i$ and may be further based on, if it is based on the first key $K_i^1$ associated with the apparatus $UE_i$, determining a first key $\overline{K}_j^1$ for each of the n−1 other apparatuses $UE_j$, wherein j∈{1, ..., i−1, i+1, ... n}, or, if it is based on the second $K_i^2$ associated with the apparatus $UE_i$, determining a second key $\underline{K}_j^2$ for each of the n−1 other apparatuses $UE_j$, wherein j∈{1, ..., i−1, i+1, ... n}, wherein this determining may be performed in a iteratively manner, e.g. as follows:

$$\begin{cases} \overline{K}^1_{i+1} = Y_{i+1} \cdot K_i^1 \\ \overline{K}^1_{i+2} = Y_{i+2} \cdot \overline{K}_i^1 \\ \vdots \\ \overline{K}^1_{i+(n-1)} = Y_{i+(n-1)} \cdot \overline{K}^1_{i+(n-2)} \end{cases}$$

(example based on the first key $K_i^1$ associated with the apparatus $UE_i$), or $$\begin{cases} \overline{K}^2_{i-1} = Y_{i-1} \cdot K_i^2 \\ \overline{K}^2_{i-2} = Y_{i-2} \cdot \overline{K}^2_{i-1} \\ \vdots \\ \overline{K}^2_{i-(n-1)} = Y_{i-(n-1)} \cdot \overline{K}^2_{i-(n-2)} \end{cases}$$

(example based on the second key $K_i^2$ associated with the apparatus $UE_i$.

Furthermore, as an example, apparatus $UE_i$ may verify whether $\overline{K}^1_{i+(n-1)} \Leftrightarrow^? K_i^2$ holds (e.g. if determination is based on the first key $K_i^1$) or whether $\overline{K}^2_{i-(n-1)} \Leftrightarrow^? K_i^1$ e.g., if determination is based on the first key $K_i^1$). For instance, if this verification is not successful, the session key negation may be discarded, otherwise apparatus $UE_i$ may proceed with determining the session key.

Then, apparatus $UE_i$ may determine the session key, which might be denoted as $SK^{SID_I}$, wherein $SID_I$ may represent an identifier of the communication session between the apparatuses of the set of apparatuses 310, 310', 310", according to one of the following equations:

$$SK^{SID_I} = \prod_{i=1}^{n} K_i^1 \text{(e.g.,}$$

if the first key $K_i^1$ of apparatus $UE_i$ is used as basis), or $$SK^{SID_I} = \prod_{i=1}^{n} K_i^2 \text{(e.g.,}$$

if the second key $K_i^2$ of apparatus $UE_i$ is used as basis),

As an example embodiment, method 900 may be performed by each apparatus of the set of apparatuses 310, 310', 310". Thus, each apparatus of the set of apparatuses 310, 310', 310" may determine the session key $SK^{SID_I}$. Furthermore, all of these apparatuses 310, 310', 310" will then determine the same session key $SK^{SID_I}$, wherein this session key may be $$SK^{SID_I} = g^{x_1 \cdot x_2 + x_2 \cdot x_3 + \ldots + x_n \cdot x_1} = g^{\sum_{i=1}^{n} x_i \cdot x_{i+1}}.$$

Figure 10:
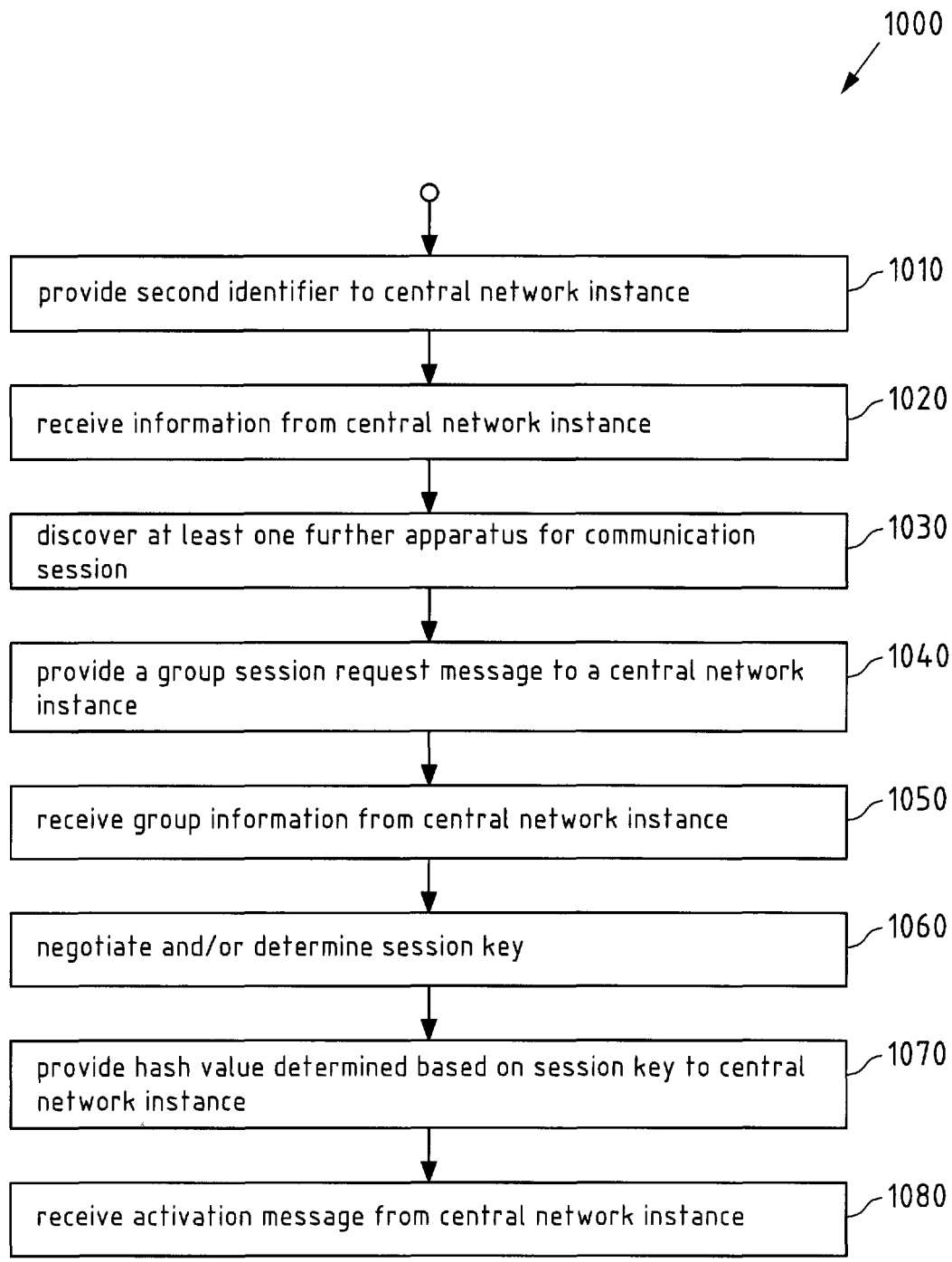
FIG. 10 is a flow chart illustrating a seventh example embodiment of methods according to a first exemplary aspect of the invention.

FIG. 10 depicts a flow chart illustrating a seventh example embodiment of a method 1000 according to the invention. For instance, method 1000 may be performed by each apparatus of the set of apparatuses 310, 310', 310".

Method 1000 will now be described for an ith apparatus (e.g. $UE_i$) of the set of apparatuses 310, 310', 310", wherein the ith apparatus may represent the first apparatus 100' or one apparatus of the at least one further apparatuses 310', 310", i.e. i∈{1, . . . , n}.

Figure 11:
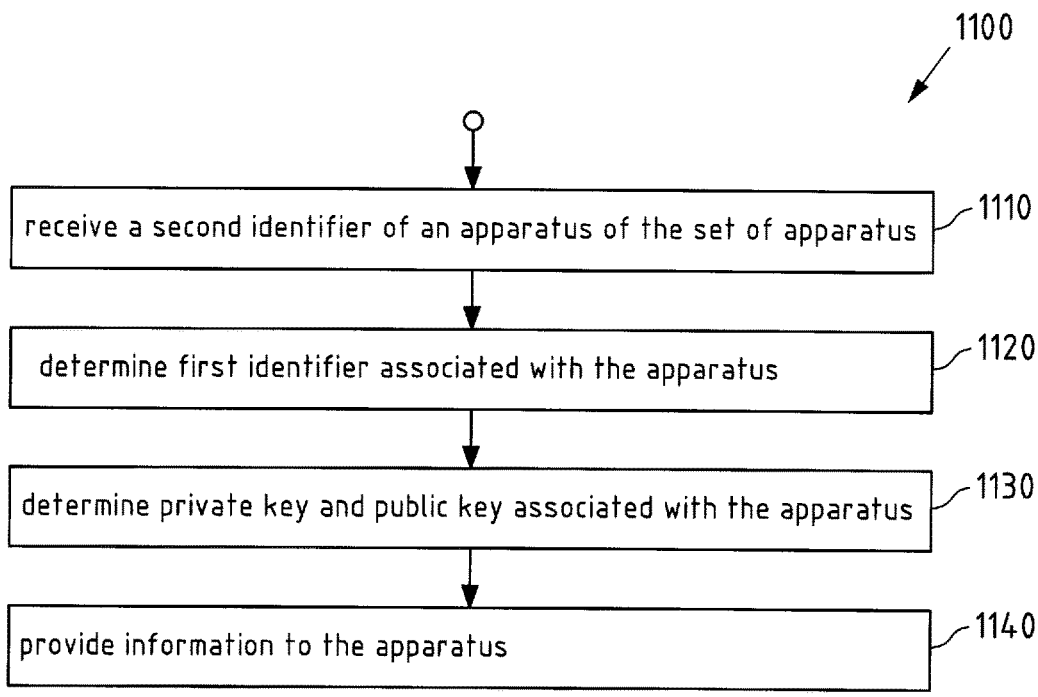
FIG. 11 is a flow chart illustrating an eighth example embodiment of methods according to a second exemplary aspect of the invention.
Figure 12:
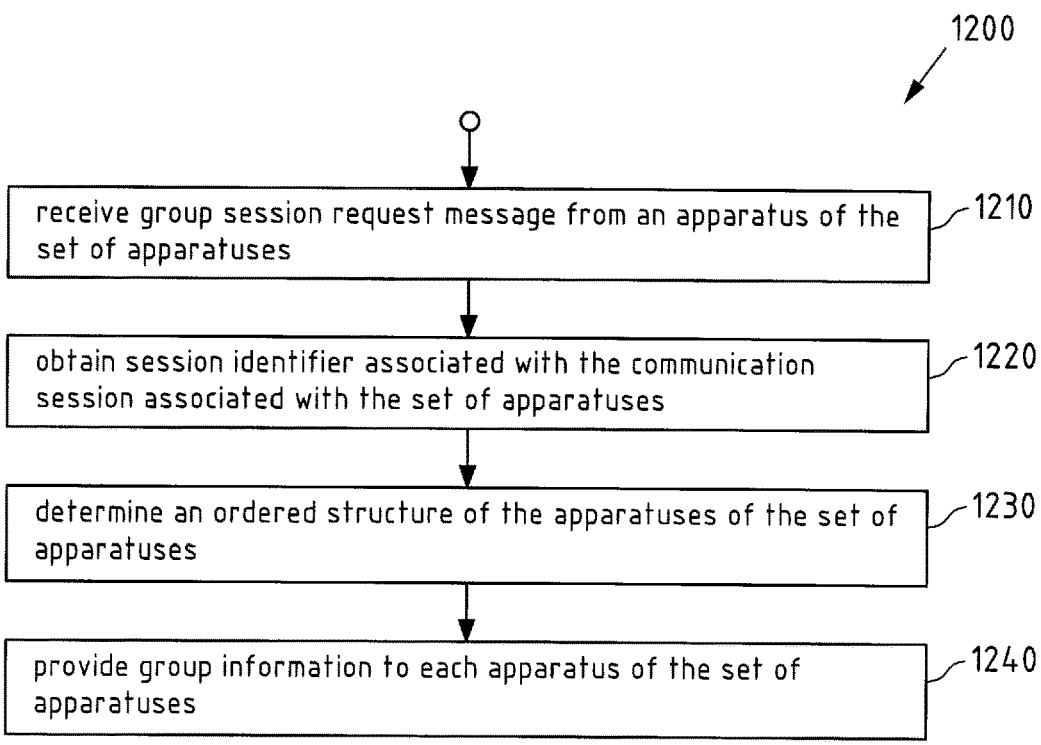
FIG. 12 is a flow chart illustrating a ninth example embodiment of methods according to a second exemplary aspect of the invention.
Figure 13:
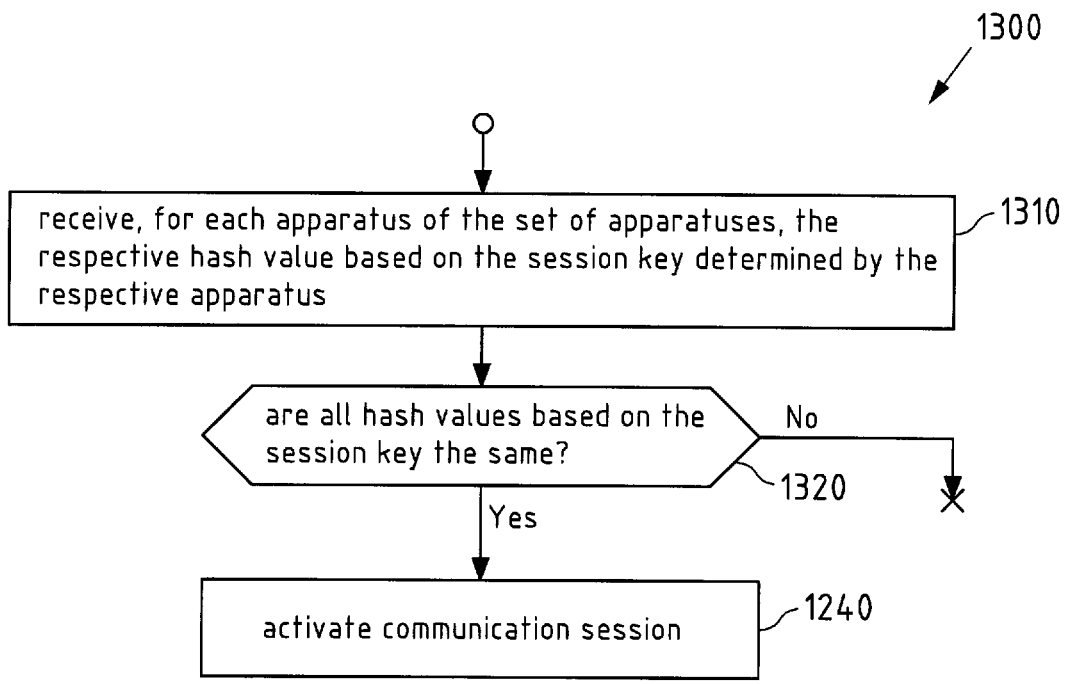
FIG. 13 is a flow chart illustrating a tenth example embodiment of methods according to a second exemplary aspect of the invention.

FIG. 11 depicts a flow chart illustrating an eighth example embodiment of a method 1100 of an exemplary second apparatus, which represents the central network instance, according to the invention, FIG. 12 depicts a flow chart illustrating a ninth example embodiment of a method 1200 of the exemplary second apparatus, which represents the central network instance, according to the invention, and FIG. 13 depicts a flow chart illustrating a tenth example embodiment of a method 1300 of an exemplary second apparatus, which represents the central network instance, according to the invention. Parts of these methods 1100, 1200 and 1300 will be explained in conjunction with the scheme illustrating an example embodiment according to a first and second exemplary aspect of the invention depicted in FIG. 15.

Apparatus $UE_i$ provides the second identifier to the central network instance 340 (action 1010), wherein the second identifier may represent the real identifier of apparatus $UE_i$. As an example, the second identifier of ith apparatus $UE_i$ may be denoted as $RID_i$.

The central network instance 340 receives this second identifier (action 1310) from apparatus $UE_i$. For instance, receiving this second identifier associated with apparatus $UE_i$ by the central network instance 340 might be considered to represent a registration request by apparatus $UE_i$.

The central network instance 340 obtains or determines a first identifier associated with the apparatus $UE_i$, wherein this identifier may represent the first identifier associated with the respective apparatus $UE_i$ mentioned with respect to the preceding example methods. Thus, the first identifier associated with apparatus is different $UE_i$ from the second identifier associated with apparatus $UE_i$, wherein, for instance, the second identifier may be a representative of a real identity of the respective apparatus $UE_i$, wherein, as an example, this real identity may be a real identify of the apparatus $UE_i$ in the communication network. Furthermore, as an example, the first identifier may represent a private identifier or anonymized identifier or a pseudonym for the first apparatus, wherein, as an example, the first identifier may be not known to specific entities in the communication network. In particular, the first identifier of an apparatus $UE_i$ may be not known to any other apparatus $UE_j$ of the set of apparatuses 310, 310', 310", wherein j∈{1, . . . , i−1, i+1, . . . n} holds.

The first identifier associated with apparatus $UE_i$ may be denoted as $PID_i$, and, for instance, may comprise a pseudonym identifier, and, optionally, at least one of an (i) expiration date, and/or (ii) and home network identifier (e.g. denoted as HNID), and/or (iii) a network of the central network (e.g. denoted as GNID) instance that determines/generates the first identifier.

Furthermore, as an optional action 1130 depicted in FIG. 11, the central network instance 340 may determine a private key $SK_i$ and a public key $PK_i$ associated with the apparatus $UE_i$, wherein the public key $PK_i$ may be calculated by $PK_i = H_i(PID_i)$ and the private key $SK_i$ may be calculated based on the public key $PK_i$ and the random number s, which may be determined by the central network instance 340, wherein $s \in Z^*_q$ may hold, and wherein the random number s may be assumed to represent the system master key, wherein $SK_i = PK_i^s$ may hold.

Thus, the central network instance 340 knows the first identifier $PID_i$ of apparatus $UE_i$ and the second identifier $RID_i$ of apparatus $UE_i$. For instance, the central network instance 340 may comprise a database or may be connected to a database, wherein the first and second identity of apparatus $UE_i$ are stored. Furthermore, as an example, the private key SK and a public key $PK_i$ associated with the apparatus $UE_i$ may also be stored in the database.

The central network instance 340 provides information to the apparatus $UE_i$ (action 1140), i.e. from said apparatus $UE_i$ which is associated with the second identifier received in action 1110. For instance this providing information from the central network instance 340 to the apparatus $UE_i$ may comprise establishing a secure channel between the central network instance 340 and the apparatus $UE_i$ in order to transmit the information via the secure channel or may represent any other well-suited secure transmission of the information from the central network instance 340 to said apparatus $UE_i$.

This information comprises the first identifier $PID_i$ of apparatus $UE_i$. Furthermore, as an example, the information comprises at least one of (i) a set of system parameters, and/or (ii) the private key $SK_i$, and/or (iii) the public key $PK_i$ associated with the apparatus $UE_i$.

The set of system parameters may by determined by the central network instance or another entity. The set of system parameters may comprise parameters of the cryptographic system being associated with the above mentioned first hash function $H_1$, the second hash function $H_2$, the third hash function $H_3$, generator g, function e (of the bilinear pairing), and the systems public key $P_{pub}$. Thus, for instance, the set of system parameters may comprise the first hash function $H_1$, second hash function $H_2$, third hash function $H_3$, generator g, function e (of the bilinear pairing), and the systems public key $P_{pub}$. The set of system parameters may be denoted as parmas.

Determining of system parameters of the set of system parameters may be performed as follows (i to iv):
(i) Obtaining or generating a tuple $\{G, G_T, q, e, g_t=(g,g)\}$, wherein this tuple may represent a bilinear pairing, e.g. according to this example of bilinear pairing:

Let G and $G_T$ be two cyclic multiplicative groups with the same prime order q. Discrete logarithm problem (DLP) is assumed to be hard in both G and $G_T$. Let g and $g_1$ be two generators of G and $G_T$ respectively. Let us have a bilinear map e: $G \times G \to G_T$, with the following properties:

Bilinear: For all $R, S \in G$ and a, $b \in \mathbb{Z}^*_q$, $e(R^a, S^b) = a(R,S)^{ab}$;

Nondegenerate: There exist $R, S \in G_1$ such that $e(R,S) \neq 1 G_2$;

Computable: There is an efficient algorithm to compute $e(R,S)$ for any $R, S \in G_1$.

The bilinear map e may be constructed by the modified Weil or Tate pairings on the elliptic curves, e.g. as described in W. Diffie and M. Hellman, "New directions in cryptography," IEEE Transactions on Information Theory, vol. IT-22, no. 6, pp. 644-654, 1976.
(ii) Obtain or determine the random number s, wherein $s \in Z^*_q$ may hold, and
(iii) Determine the system public key as $P_{pub} = g^s$,
(iv) Determine or choose three cryptographic hash functions $H_1:(0,1)^* \to G$, $H_2:[0,1]^* \times G \to \mathbb{Z}^*_q$ and $H_2:G \to \mathbb{Z}^*_q$ As an example, the set of system parameters may represent parmas=$\{G, G_T, g, g_T, e, P_{pub}, H_1, H_2, H_3\}$.

Furthermore, the random number may be considered to represent the system master key and may be kept secret by the central network instance, i.e., the system master key may not be known and may be made not available to any apparatus $UE_i$ of the set of apparatuses 310, 310', 310".

The information provided by the central network instance 340 to apparatus $UE_i$ in action 1140 is received by the apparatus $UE_i$ in action 1020 of method 1000.

As an example embodiment, method 1100 may be performed by the central network instance 340 for each apparatus of the set of apparatuses 310, 310', 310', wherein in action 1110 the respective second identifier $RID_i$ of the respective apparatus $UE_i$ is received, and in action 1120 the first identifier of the respective $PID_I$ of the respective apparatus $UE_i$ is determined, and in action 1130 the private key and the public key associated with respective apparatus $UE_i$ are determined, and wherein in action 1140 the information is provided to the respective apparatus $UE_i$.

Similarly, actions 1010 and 1020 of the method 1000 may be performed by each apparatus of the set of apparatuses 310, 310', 310".

Furthermore, as an example, it has to be understood that actions 1010 and 1020 of method 1000 may be considered to represent an aspect being independent from other actions 1030 to 1080 of method 1000.

In action 1030, apparatus $UE_i$ discovers at least one further apparatus for the communication session, which might represent the above mentioned D2D communication session. For instance, the n apparatuses of the set of apparatuses wants to discover each other. This discovery is based on the first identifier of the respective apparatus $UE_i$ of the set of apparatuses and thus privacy can be maintained. Thus, at the end, the at least one further apparatus represents the other apparatus(es) $UE_j$ of the set of apparatuses 310, 310', 310", wherein $j \in \{1, \ldots, i-1, i+1, \ldots n\}$ holds. For instance, said discovery between the apparatuses may be performed based on the techniques described in D. Boneh and M. Franklin, "Identity-Based Encryption from the Weil Pairings," Advances in Cryptology-Asiacrypt, Springer-Verlag, pp. 514-532, 2001.

For instance, after action 1030 has been performed by apparatus $UE_i$ the apparatus $UE_i$ knows the first identifier $PID_j$ and, optionally, the public key $SK_j$ of each other apparatus $UE_i$ of the set of apparatuses 310, 310', 310", wherein $j \in \{1, \ldots, i-1, i+1, \ldots n\}$ holds.

Action 1030 may be performed by each apparatus of the set of apparatuses 310, 310', 310".

In action 1040, apparatus $UE_i$ provides a group session request message to the central network instance 340. For instance, the group session request message provided by apparatus $UE_i$ may be denoted as $M_i^{req}$.

The group session request message comprises the first identifier of apparatus UE; or the second identifier of apparatus $UE_i$.

For instance, the group session request message may further comprise the first identifier of each other apparatus $UE_j$ of the set of apparatuses 310, 310', 310", wherein $j \in \{1, \ldots, i-1, i+1, \ldots n\}$ holds, and wherein this may represent the first identifier of each further apparatus of at least one further apparatus of the at least one further apparatus. Thus, as an example, $M_i^{req}$ may be $M_i^{req} = (RID_i, PID_1, PID_2, PID_{i-1}, PID_{i+1}, \ldots, PID_n)$.

Action 1040 may be performed by each apparatus of the set of apparatuses 310, 310', 310".

The central network instance 340 may receive the group session request message $M_i^{req}$ from apparatus $UE_i$ of the set of apparatuses 310, 310', 310" in action 1210.

For instance, the central network instance 340 may receive the group session request message $M_i^{req}$ from each apparatus $UE_i$ of the set of apparatuses 310, 310', 310" in action 1210.

As an example, central network instance 340 may wait with performing further actions of method 1200 until it receives the n group session request messages $M_i^{req}$ from all n apparatuses of the set of apparatuses.

As an example embodiment, if the first identifiers in the received group session request messages $M_i^{req}$ comprises an expiration date, the central station 340 may check whether expiration date of one or more of the first identifiers $PID_i$, wherein $i \in \{1, \ldots, n\}$ holds, is out of date. If yes, the central network instance 340 may stop method 1200, if not, it may proceed.

In action 1220, the central network instance 340 obtains and or determines a session identifier, which may be denoted as $SID_I$, associated with the communication session associated with the set of apparatuses 310, 310', 310".

In action 1230 the central network instance 340 orders the n apparatuses of the set of apparatuses in ordered structure being represented by an ordered list of apparatuses, which might be denoted as $S_{SID_I}$, wherein $S_{SID_I}$ may be $S_{SID_I} = \{UE_1, \ldots, UE_i, \ldots, UE_n\}$. For instance, the n apparatuses might be ordered by the central network instance in accordance with a ring structure, wherein $UE_{i-1}$ and $UE_{i+1}$ are respectively left and right neighbors of $UE_i$ for $1 \leq i \leq n$, $UE_0 = UE_n$ and $UE_1 = UE_{n+1}$. Furthermore, action 1230 may comprise ordering the n apparatuses of the set of apparatuses in ordered structure by ordering the first identifiers of the n apparatuses, wherein this ordering may be represented by a pseudonym order representative $P_{SID_I}$ comprising the ordered first identities of the apparatuses of the set of apparatuses, wherein $P_{SID_I}$ may be $P_{SID_I}=\{PID, \ldots, PID_i, \ldots, PID_n\}$, and wherein, for instance, the n apparatuses might be ordered by the central network instance in accordance with a ring structure.

In action 1240 the central network instance 340 provides group information to each apparatus of the set of apparatuses.

For instance, the group information comprises the pseudonym order representative $P_{SID_I}$ and, optionally, the session identifier $SID_I$.

This group information provided by the central network instance during action 1240 may be received by apparatus $UE_i$ in action 1050. Action 1050 may be performed by each apparatus of the set of apparatuses 310, 310', 310".

In action 1060, the apparatus $UE_i$ negotiates and/or determines the session key $SK^{SID_I}$ associated with the communication session of the set of apparatuses, wherein this may be performed by method 200, and, optionally, based on method 400 and/or method 500, and/or method 600, and/or method 700, and/or on method 800, and/or on method 900. Action 1050 may be performed by each apparatus of the set of apparatuses 310, 310', 310" and may be considered as independent action being independent from the other actions of method 1000.

After apparatus $UE_i$ has determined the session key $SK^{SID_I}$ the apparatus $UE_i$ determines a hash value based on the session key $SK^{SID_I}$ and, as an example, based on the third hash function $H_3$. This hash value may be denoted as $Seed_i^{SID_I}$ and may be calculated by $Seed_i^{SID_I}=H_3(SK_i^{SID_I})$. This determining a hash value may be performed by each apparatus of the set of apparatuses 310, 310', 310".

In action 1070, apparatus $UE_i$ provides the hash value $Seed_i^{SID_I}$ determined based on the session key $SK^{SID_I}$ to the central network instance 340. Action 1070 may be performed by each apparatus of the set of apparatuses 310, 310', 310".

In action 1310, the central network instance 340 receives, for each apparatus of the set of apparatuses 310, 310', 310", the respective hash value $Seed_i^{SID_I}$, wherein $i \in \{1, \ldots, n\}$ holds.

It is then checked, in action 1320, by the central network instance 340 whether all hash values received in action 1310 are the same or not.

If they are same, i.e. yes, then the central network instance 340 activates the communication session associated with the set of apparatuses 310, 310', 310" (action 1330). This may comprise sending an activation message to each apparatus of the set of apparatuses 310, 310', 310".

If checking in action 1320 yields a negative result the central network instance 340 may not active the communication session associated with the set of apparatuses 310, 310', 310".

In action 1080 of method 1000 apparatus $UE_i$ receives the activation message from the central network instance. Action 1080 may be performed by each apparatus of the set of apparatuses 310, 310', 310".

Then, for instance, apparatus $UE_i$ may perform secure communicate with one or more apparatuses of the set of apparatuses 310, 310', 310" based on the session key $SK^{SID_I}$, wherein this communication may represent said D2D communication.

For instance, the central network instance 340 does know the session key $SK^{SID_I}$. Activation of the communication session by the central network instance 340 is performed based on the hash values received in action 1310, and thus, the central network instance 340 does not need to know the session key $SK^{SID_I}$. Accordingly, communication of the communications session between apparatuses of the set of apparatuses 310, 310', 310" cannot be tampered by the central network instance 340 since the central network instance has no idea about the real session key.

As an example, example aspects of this invention may provide a universal privacy preserving authentication and key agreement protocol for D2D communications based on Identity-Based signature and group key agreement. It may help D2D users to generate the security session key for a group D2D communication session without threatening users' private information in the scenario of wireless network coverage.

For instance, the set of apparatuses 310, 310', 310", i.e. the first apparatus and the at least one further apparatus, may be considered as a group associated with the communication session.

As an example embodiment, the the group may be revoked based on at least one of an expiration date associated with the session key of the communication session, and/or a change of membership in the group, wherein said revoking the group comprises determining a new session key.

Figure 14:
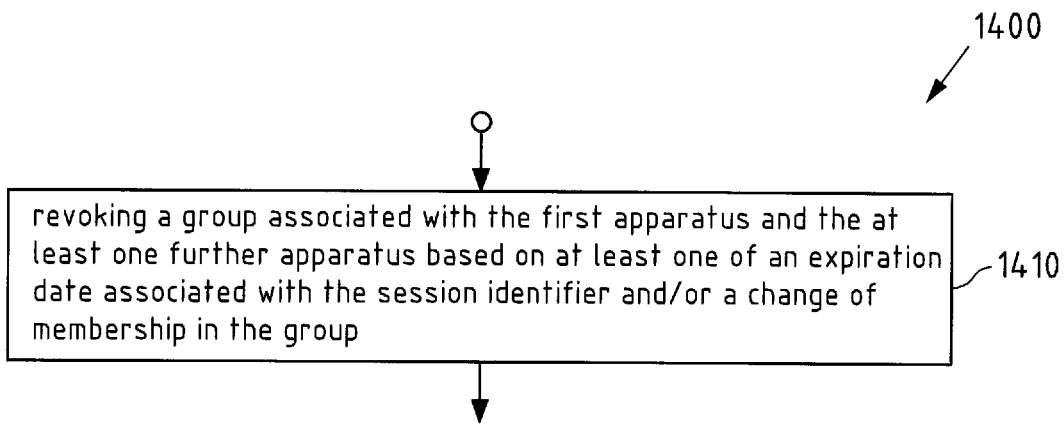
FIG. 14 is a flow chart illustrating an eleventh example embodiment of methods according to a first exemplary aspect of the invention.

FIG. 14 depicts a flow chart illustrating an eleventh example embodiment of a method 1400 according to the invention. For instance, method 1400 may be performed by each apparatus of the set of apparatuses 310, 310', 310", and, in particular, it may be performed for at least one apparatus associated with the group associated with the communication session, and/or, for instance, if a new apparatus wants to join the communication session, it may be performed for the new apparatus. For instance, a new apparatus may be of the same type as the first apparatus 100, 310 or one of the at least one further apparatus 310', 310". Thus, the explanations given with respect to the first apparatus and/or the a further apparatus of the at least one further apparatus may also hold for the new apparatus.

According to action 1410, the group is revoked based on at least one of an expiration date associated with the session key of the communication session, and/or a change of membership in the group, wherein said revoking the group comprises determining a new session key.

For instance, a change of membership may occur if at least one new apparatus joins the group as new member and/or if at least one of the apparatuses of the set of apparatuses revokes from the group (and thus from the communication session.). As an example, each new apparatus may represent an apparatus of the type of first apparatus as mentioned above.

Figure 16:
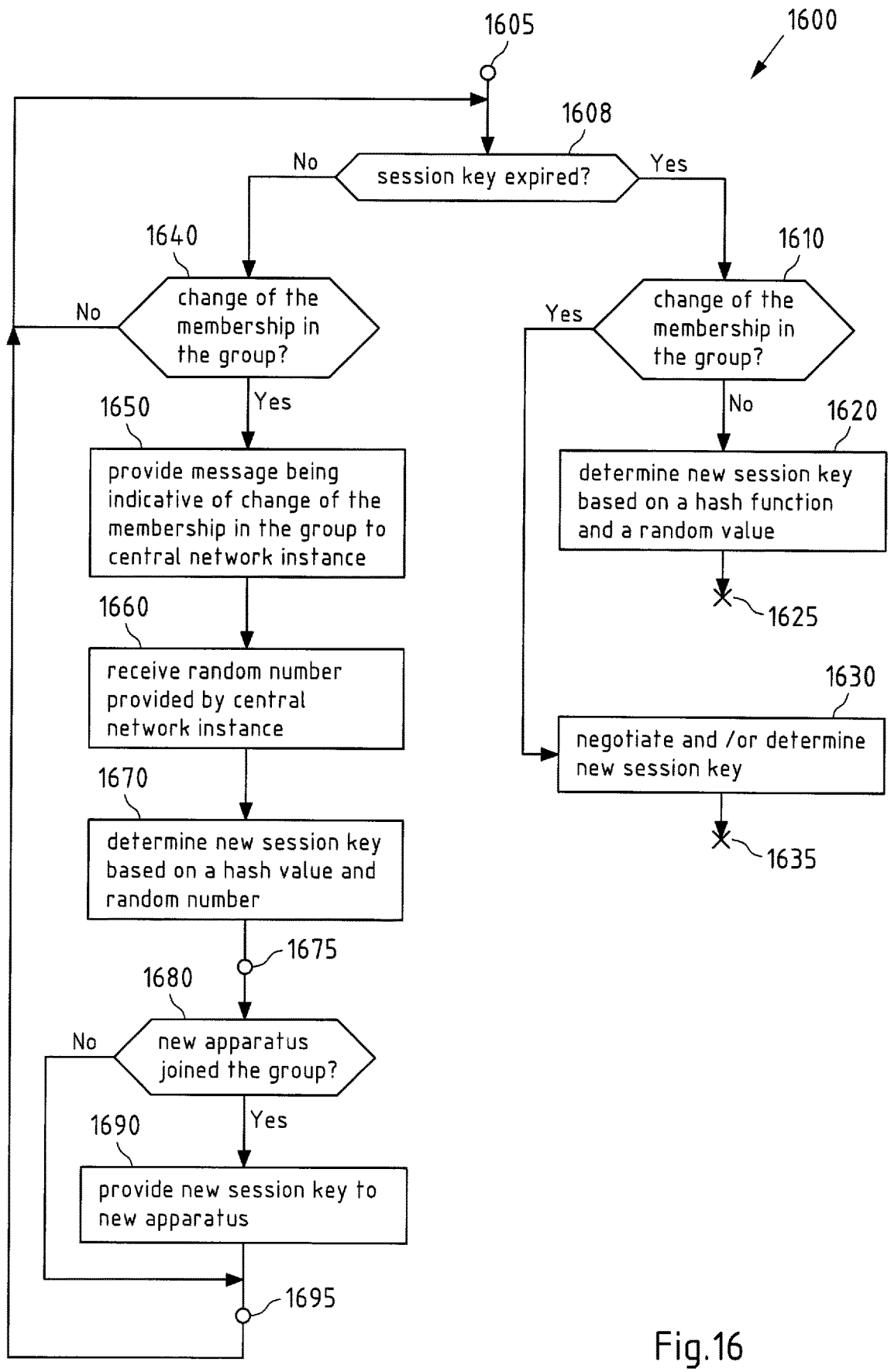
FIG. 16 is a flow chart illustrating a twelfth example embodiment of methods according to a first exemplary aspect of the invention.
Figure 17:
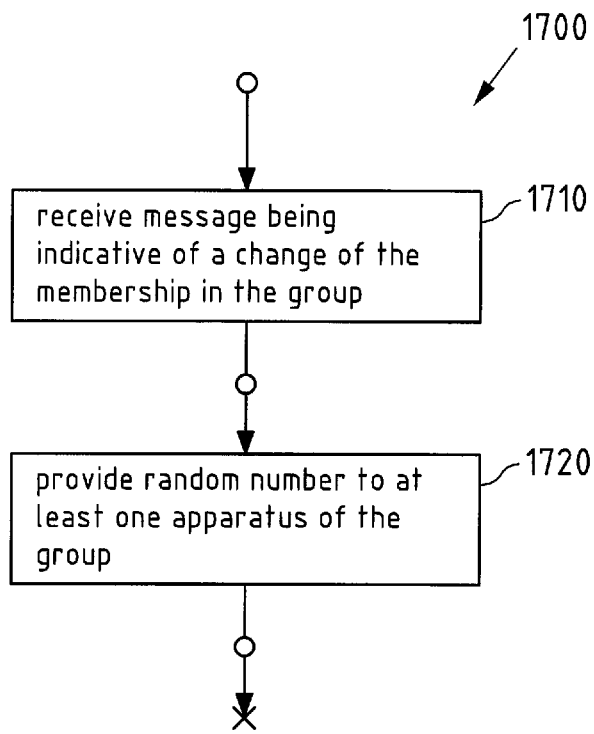
FIG. 17 is a flow chart illustrating a thirteenth example embodiment of methods according to a second exemplary aspect of the invention.

FIG. 16 depicts a flow chart illustrating a twelfth example embodiment of a method 1600 according to the invention. For instance, method 1600 may be performed by at least one apparatus of the set of apparatuses 310, 310', 310", and, in particular, it may be performed for at least one apparatus associated with the group associated with the communication session, and/or, for instance, if a new apparatus wants to join the group associated with the communication session, it may be performed for the new apparatus. Furthermore, method 1600 will be explained in conjunction with the example embodiment of a method 1700 depicted in FIG. 17 performed by the central network instance. As an example, method 1600 may be considered as a part of method 1400.

It is checked whether the expiration date of the session key of the communication session associated with the group is expired (action 1608).

If the expiration date associated with the session key is expired it is checked whether there are changes of the membership in the group (action 1620), wherein such a change may be at least a new apparatus that wants to join or has joined the group and/or at least one apparatus which wants to revoke or has revoked membership in the group. If there are no changes of the membership the new session key is determined (action 1620) based on a hash function and a random value. This random value may be a random number available to each apparatus associated with the group. For instance, this random number may be the expired session key. Furthermore, for instance, the new session key may be associated with a new expiration date. Thus, as an example, if the group membership has no any changes, the group members, i.e. the apparatuses of the set of apparatuses 310, 310', 310", may automatically generate a new session key by hashing the current session key $SK_i^{SID_l}$ with a commonly agreed random (e.g., the expired time $ET_i^{SK_i}$ of old session key that is known by every group member). That is $SK_i^{SID_{l+1}} = H(ET_i^{SK_i}, SK_i^{SID_l})$. As an example, this hash function H may represent the above mentioned first hash function $H_1$ or second hash function $H_2$ or another well-suited hash function. For instance, group session activation can also be applied by performing action 1070 for each apparatus $UE_i$ of the set of apparatuses, wherein each member of the group sends the new hash value $Seed_i^{SID_{m+1}} = H_g(SK_i^{SID_{l+1}})$ of the new session key to the central network instance 340, which then checks by method 1300 the received hash values and, if successful, activates the new group session in action 1330.

If a change of the membership in the group is detected in action 1610, i.e. if the expiration date associated with the session key is expired and there are changes of the membership in the group, a new session key is negotiated and/or determined by the apparatus (action 1630), wherein this may be performed by method 200, and, optionally, based on method 400 and/or method 500, and/or method 600, and/or method 700, and/or on method 800, and/or on method 900, i.e. the new session key is determined (action 1630) based on:

providing, by the first apparatus, at least one message to at least one further apparatus of at least one further apparatus, wherein each of the at least one message comprises a key information of the first apparatus and is associated with the first identifier associated with the first apparatus (i.e. according to action 220 of method 200), and determining, by the first apparatus, the new session key of the communication session associated with the first apparatus and the at least one further apparatus, based on at least one message received, by the first apparatus, provided by at least one further apparatus of the at least one further apparatus, wherein each of the at least one message comprises a key information of the respective further apparatus and is associated with a first identifier associated with the respective further apparatus, wherein the first apparatus and the at least one further apparatus are members of the group after the membership in the group has changed (i.e. according to action 230 of method 200). Furthermore, the new session key may be associated with a new expiration date.

Thus, the new group's session key could be determined based on method 200, and, as an example, based on method 1000, 1100 and 1200, e.g. just like initiating a totally new group session, wherein, as an example, method 200 is performed for each apparatus of the set of new apparatuses, wherein the apparatuses of the set of new apparatus represent the valid apparatuses associated with the communication session after the changes in the membership of the group has been performed.

If the session key is not expired then method 1600 may proceed with determining whether there is a change of the membership in the group (action 1640). If no change of the membership is determined, the method 1600 may jump to reference sign 1605.

If a change of the membership is determined, wherein such a change may be at least a new apparatus that wants to join or has joined the group and/or at least one apparatus which wants to revoke or has revoked membership in the group, the apparatus provides a message being indicative of the change of the membership in the group to the central network instance 340 (action 1650). For instance, if at least one apparatus has revoked the group, the message may comprise the first identifier of one or each of the at least one apparatus that has revoked in the group. And/or, if at least one new apparatus wants to join the group and thus the communication session between apparatuses of the group, the message may comprise the first identifier of one or each of the at least one new apparatus.

As an example, if a new apparatus wants to join the group, it is assumed that the new apparatus has registered or registers to the central network instance, e.g. by providing a message to the central network instance 340 comprising the second identifier of the new apparatus, which may represent the real identity of the new apparatus, e.g. in a same way as described with respect to action 200 in method 200 with respect to the first apparatus, wherein the central network instance may performed method 1100 or method 1900 depicted in FIG. 1900 in order to provide the first identifier (action 1140 or action 1950), which may be assumed to be a pseudonym of the respective new apparatus, to the new apparatus. Thus, based on this registration, the new apparatus receives its first identifier, which may then be used for communication with another apparatus of the group associated with the communication session. E.g., details of this registration will be explained by the example method 1900 later.

For instance, as depicted in example method 1700, the central network instance 340 may receive this message being indicative of a change of the membership in the group (action 1710), which may be provided by action 1650 of method 1600. As an example, the central network instance 340 may receive only one message being indicative of a change of the membership in the group (action 1710) or it may receive two or more message being indicative of a change of the membership in the group (action 1710), e.g. from different apparatuses of the group.

Then, for instance, the central network instance 340 determines a new random number and provides this new random number to at least one apparatus of the group (action 1720), wherein this group represents the group after the change of membership. E.g., the random number may be provided to each apparatus of the group which has joined the group before change of the membership and which still joins the group after change of membership. Said providing the random number may be performed based on a transmission via the communications network, as explained with respect to other examples of methods. Furthermore, for instance, the random number may not be transmitted from the central network instance 340 to the at least one new apparatus.

In action 1660 of method 1600 the apparatus receives this random number provided by the central network instance. Then, the apparatus determines a new session key based on a hash value and the received random number (action 1670).

Thus, if the expiration date associated with the session key is not expired and if there is a change of the membership in the group, the new session key is determined (action 1670) based on a hash function H and the received random number. Further, the new session key may be determined based on a hash function H, the received random number and the (former) session key (action 1670). For instance, this hash function H may represent the above mentioned first hash function H, or second hash function $H_2$ or another well-suited hash function, wherein the new session key may by determined by $SK_i^{SID_{l+1}}=H(r',SK_i^{SID_l})$. Furthermore, the new session key may be associated with a new expiration date.

According to this example embodiment, the group membership may be changed before the session key is expired, e.g., at least one apparatus of the set of the apparatuses revokes but no new apparatus joins. In this case, the group member apparatuses may report the central network instance 340 on new members for the next group session, e.g. based on action 1650, and the central network instance may issue a new valid random r' to valid group members (e.g. based on action 1720 of method 1700), i.e. to valid apparatuses of the set of apparatuses for them to generate a new session key with a new expired time. $SK_i^{SID_{l+1}}=H(r',SK_i^{SID_l})$ (e.g. based on action 1670. For instance, this hash function H may represent the above mentioned first hash function $H_1$ or second hash function $H_2$ or another well-suited hash function. Group Session Activation can also be applied. For instance, each member (i.e., each apparatus of the set of apparatuses comprising the valid apparatuses without the at least one apparatus that has revoked)) sends the new hash value $Seed_i^{SID_{l+1}}=H_3(SK_i^{SID_{l+1}})$ of the new session key to the central network instance 340, which then checks by method 1300 the received hash values and, if successful, activates the new group session in action 1330.

The apparatus may then check whether a new apparatus has joined or would like to join the group (action 1680). If yes, the apparatus provides the new session key to the new apparatus (action 1690), e.g. based on a communication via a temporal secure channel between the apparatus and the new apparatus, for instance using a key-exchange, e.g. based on Diffie-Hellmann key exchange (DHKE). For instance, of two or more new apparatuses as joined or would like to join the group, the apparatus may provide the new session key to each of the two or more new apparatuses based on a communication via a temporal secure channel between the apparatus and the respective new apparatus of the two or more new apparatuses.

Thus, for instance, according to this example embodiment, the group membership is changed before the session key is expired and at least one new apparatus would like to join the group communications associated with the set of apparatuses. The central network instance 340 may send the at least one new apparatus a joint certificate (e.g. based on method 1100 or method 1900). The at least one new apparatus communicates with one apparatus of the set of apparatuses (i.e. the original set of apparatus) existing new session member for getting the new session key $SK_i^{SID_{l+1}}=H(r',SK_i^{SID_l})$ through a temporal secure channel between the two devices (e.g., using DHKE). For instance, this hash function H may represent the above mentioned first hash function $H_1$ or second hash function $H_2$ or another well-suited hash function. Thus, the new session key may be determined based on the hash function H, the former session key and the random number r', where new valid random r' is issued by the central network instance to existing valid group members (i.e. the new set of apparatuses comprising the set of apparatuses and the at least one new apparatus) for them to generate a new session key with a new expired time. $SK_i^{SID_{l+1}}=H(r', SK_i^{SID_l})$. Group Session Activation may also be applied, wherein each apparatus of the new set of apparatuses) member sends the new hash value of the new session key in action 1070 to the central network instance, which then checks by method 1300 the received hash values and, if successful, activates the new group session in action 1330.

For instance, with respect to method 1600, at reference sign 1695 shows that the method 1600 may jump to the start to reference sign 1605.

As an example embodiment, said negotiating and/or determining a new session key according to action 1630 may be performed if the session key is expired and if there has been a change of the member in the group, i.e., e.g. actions 1650-1690 may be replaced with action 1630, wherein the said negotiating and/or determining a new session key is performed for each apparatus of the group associated with the communication session, wherein this group represents the group after the change has been performed.

Figure 18:
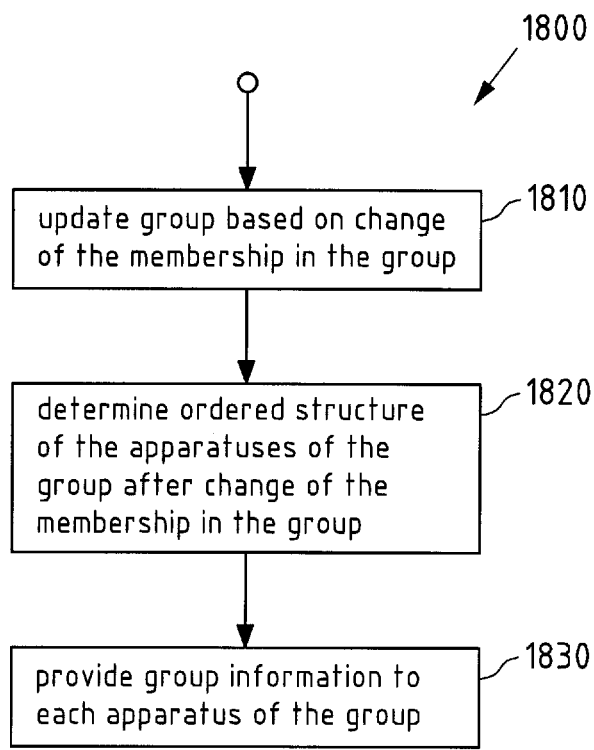
FIG. 18 is a flow chart illustrating a fourteenth example embodiment of methods according to a second exemplary aspect of the invention.
Figure 19:
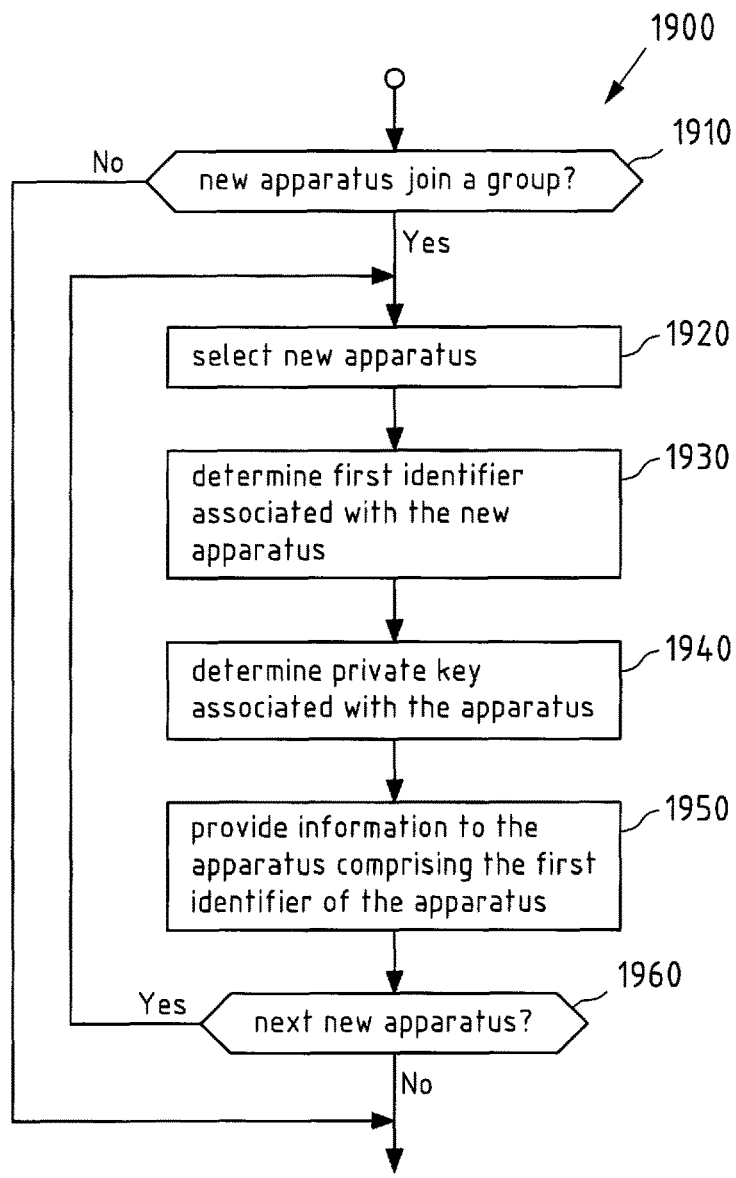
FIG. 19 is a flow chart illustrating a fifteenth example embodiment of methods according to a second exemplary aspect of the invention.

FIG. 18 depicts a flow chart illustrating an fourteenth example embodiment of a method 1800 of an exemplary second apparatus, which represents the central network instance 340, according to the invention, FIG. 19 depicts a flow chart illustrating a fifteenth example embodiment of a method 1900 of the exemplary second apparatus, which represents the central network instance 340, according to the invention.

For instance, method 1900 may be considered to be used for registration of at least one new apparatus that would like to join the group associated with the communication session.

It is checked, by the central network instance 340, whether a new apparatus would like to join the group associated with the communication session (action 1910). For instance, if the central network instance 340 receives from a new apparatus, which is actually not part of the group associated with the communication session, a message comprising the second identifier of the new apparatus, wherein this message may correspond to the message provided by the first apparatus during action 220 in FIG. 2, the central network instance 340 may decide that this new apparatus wants to join a communication group.

Then, the central network instance 340 selects this new apparatus (action 1920) and determines a first identifier associated with the new apparatus (action 1930), wherein this may be performed as explained with respect to action 1120 in method 1100, e.g. all explanations given with respect to action 1120 may also hold for action 1930. Furthermore, the central network instance determines a private key associated with the selected apparatus (action 1940) and, optionally, a public key associated with the selected apparatus, wherein this may be performed as explained with respect to action 1130 of method 1100, e.g. all explanations given with respect to action 1130 may also hold for action 1940. Then, the central network instance 340 provides information to the selected apparatus (action 1950). For instance this providing information from the central network instance 340 to the apparatus $UE_i$ may comprise establishing a secure channel between the central network instance 340 and the apparatus $UE_i$ in order to transmit the information via the secure channel or may represent any other well-suited secure transmission of the information from the central network instance 340 to said apparatus $UE_i$.

This information comprises the first identifier of the selected apparatus. Furthermore, as an example, the information comprises at least one of (i) a set of system parameters, and/or (ii) the private key $SK_i$, and/or (iii) the public key $PK_i$ associated with the selected apparatus.

The set of system parameters may be determined by the central network instance or another entity. The set of system parameters may comprise parameters of the cryptographic system being associated with the above mentioned first hash function $H_1$, the second hash function $H_2$, the third hash function $H_3$, generator g, function e (of the bilinear pairing), and the systems public key $P_{pub}$. Thus, for instance, the set of system parameters may comprise the first hash function $H_1$, second hash function $H_2$, third hash function $H_3$, generator g, function e (of the bilinear pairing), and the systems public key $P_{pub}$. The set of system parameters may be denoted as parmas. This set of system parameters may correspond to the set of system parameters explained with respect to action 1140 of method 1100.

Then, the central network instance may determine whether there is a next new apparatus that would like to join the group associated with the communication session. If yes, the method 1900 may proceed with selecting this next new apparatus as selected new apparatus in action 1920 and may proceed as explained above.

For instance, this method 1900 may be performed by the central network instance 340 when it receives a request message from a new apparatus that would like to join the group, wherein this message may comprise the second identifier of the new apparatus.

Figure 20:
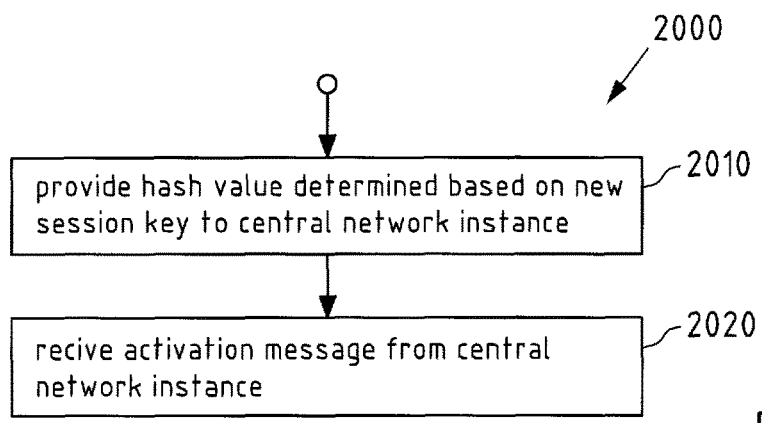
FIG. 20 is a flow chart illustrating a sixteenth example embodiment of methods according to a first exemplary aspect of the invention.

Furthermore, after a new session key has been determined by method 1400 or method 1600, e.g. based on action 1670 or on action 1620 or on action 1630, according to an example embodiment, a group session activation may be performed, wherein this group session activation may be performed based on the 15th example method 2000 depicted in FIG. 20 and based on the method 1300 performed by the central network instance 340.

For instance, method 2000 may be performed for each apparatus of the group associated with the communication session after the new session key has been determined, and, if there are changes in the membership in the group, after the change has been performed. In the sequel, the method 2000 will be explained for one apparatus of the apparatuses of the group, but it may be performed for each apparatus of the group.

In action 2010, the apparatus provides a hash value determined based on the new session key to the central network instance. For instance, the hash value may be determined by the apparatus based on the new session key $SK^{SID_{I+1}}$ and, as an example, based on the third hash function $H_3$. This hash value may be denoted as $Seed_i^{SID_{I+1}}$ and may be calculated by $Seed_i^{SID_{I+1}} = H_3(SK_i^{SID_{I+1}})$.

In action 1310, the central network instance 340 receives, for each apparatus of the set of apparatuses, wherein now the set of apparatuses represent the n apparatuses associated with group, i.e., if there has been changes to the membership of the group, then these changes are considered in this group, the respective hash value $Seed_i^{SID_I}$, wherein $i \in \{1, \ldots, n\}$ holds.

It is then checked, in action 1320, by the central network instance 340 whether all hash values received in action 1310 are the same or not.

If they are same, i.e. yes, then the central network instance 340 activates the communication session associated with the group of communication' (action 1240). This may comprise sending an activation message to each apparatus of the set of apparatuses, i.e. sending this activation message to each apparatus of the group.

If checking in action 1320 yields a negative result the central network instance 340 may not active the communication session associated with the set of apparatuses, i.e. associated with the group.

In action 2020 of method 2000 the apparatus receives the activation message from the central network instance.

Then, for instance, the apparatus may perform secure communication with one or more apparatuses group associated with the communication session based on the new session key $SK^{SID_{I+1}}$, wherein this communication may represent said D2D communication.

As an example, method 2000 may be performed at reference sign 1675, or reference sign 1695, or reference sign 1625 or reference sign 1635 in method 1600.

As an example embodiment, for instance, methods 1600, 1700, 1800, 1900 and 2000 might be considered to represent a separate aspect of the invention being disclosed separately.

For instance, the example embodiment according to example method 1800 may be used for updating group information by the central network instance 340. According to action 1810, the group associated with the communication session is updated based on a change of the membership, wherein this change of the membership may be determined by the central network instance based on the at least one message received by action 1710 in method 1700, and wherein such a change may be at least a new apparatus that wants to join or has joined the group and/or at least one apparatus which wants to revoke or has revoked membership in the group. For instance, the central network instance 340 may comprise a database or may be connected to a database, and this group information may be stored in this database.

For instance, in action 1820 the central network instance 340 orders the n' apparatuses of group after change of the membership in the group into an ordered structure being represented by an ordered list of apparatuses, which might be denoted as $S_{SID_{I+1}}$, wherein $S_{SID_{I+1}}$ may be $S_{SID_{I+1}} = \{UE_1, \ldots, UE_i, \ldots, UE_{n'}\}$. As an example, if the number of apparatuses that have revoked from the group is equal to the number of new apparatuses joining the group, n'=n holds, and if the number of apparatuses that have revoked from the group is higher than the number of new apparatuses joining the group, n'<n holds, and, if the number of apparatuses that have revoked from the group is lower than the number of new apparatuses joining the group, n'=n holds, and if the number of apparatuses that have revoked from the group is higher than the number of new apparatuses joining the group, n'>n holds.

For instance, the n' apparatuses might be ordered by the central network instance in accordance with a ring structure, wherein $UE_{i-1}$ and $UE_{i+1}$ are respectively left and right neighbors of $UE_i$ for $1 \leq i \leq n'$, $UE_0 = UE_{n'}$ and $UE_1 = UE_{n'+1}$. Furthermore, action 1820 may comprise ordering the n' apparatuses of the set of apparatuses in ordered structure by ordering the first identifiers of the n' apparatuses of the group, wherein this ordering may be represented by a pseudonym order representative $P_{SID_{I+1}}$ comprising the ordered first identities of the apparatuses of the set of apparatuses, wherein $P_{SID_{I+1}}$ may be $P_{SID_{I+1}} = \{PID_1, \ldots, PID_i, \ldots, PID_{n'}\}$, and wherein, for instance, the n' apparatuses might be ordered by the central network instance in accordance with a ring structure.

In action 1830 the central network instance 340 provides group information to each apparatus of the group. For instance, the group information comprises the pseudonym order representative $P_{SID_{I+1}}$ and, optionally, the session identifier $SID_{I+1}$.

This group information provided by the central network instance during action 1830 may be received by each apparatus of the group associated with the communication session.

Figure 15:
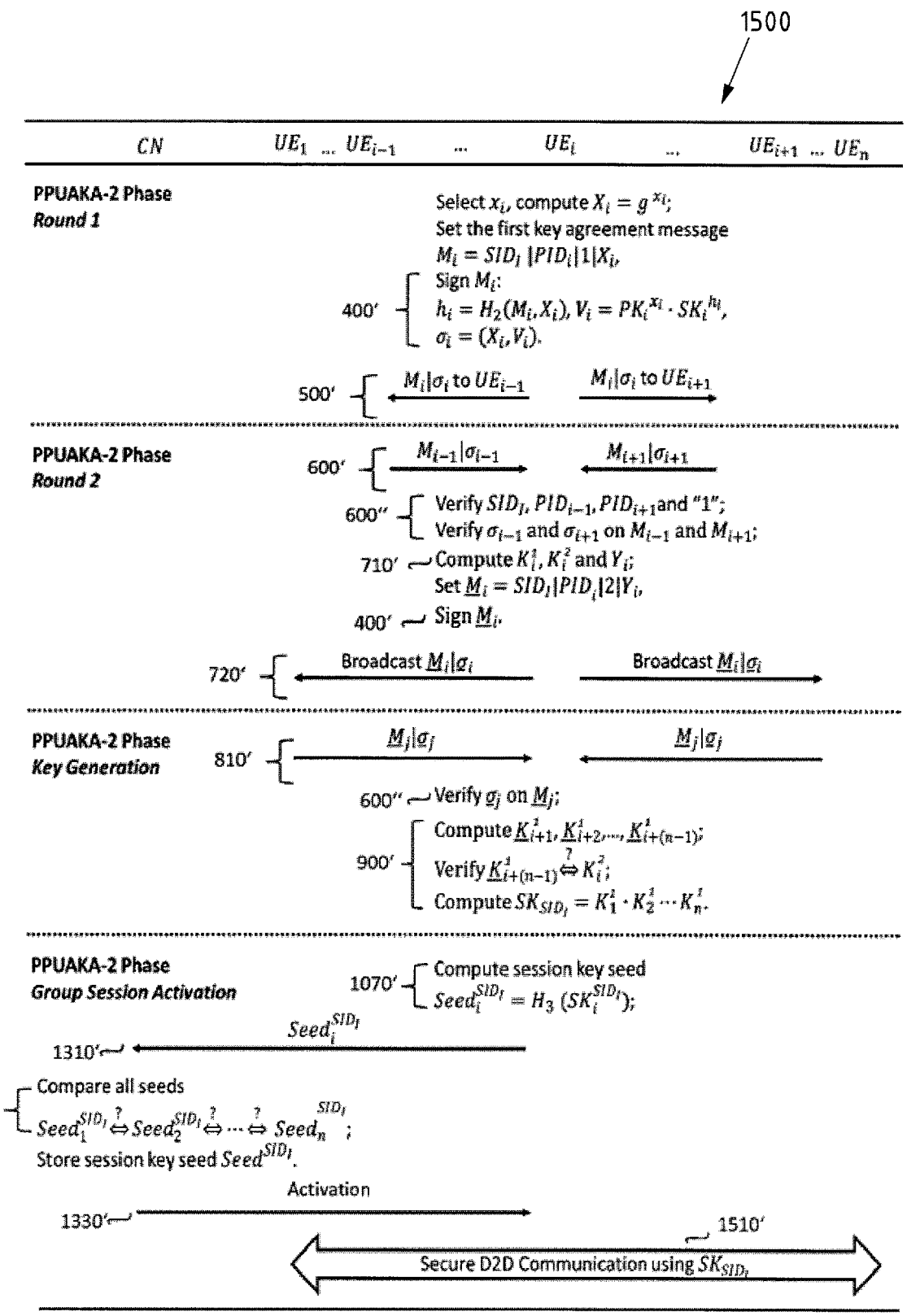
FIG. 15 is a scheme illustrating an example embodiment according to a first and second exemplary aspect of the invention.

FIG. 15 is a scheme 1500 illustrating an example embodiment according to a first and second exemplary aspect of the invention. For instance, this scheme may be used for implementing method 200, and/or method 400, and/or method 500, and/or method 600, and/or method 700, and/or method 800, and/or method 900, and/or parts of method 1000, and/or method 1300.

In scheme 1500 the central network apparatus 340 is denoted as CN, whereas the apparatuses of the set of apparatuses are denoted as $UE_j$, wherein $j \in \{1, \ldots, i-1, i, i+1, \ldots n\}$.

In Round 1 of scheme 1500 the respective apparatus $UE_j$ may select or determine the random number $x_i$ and may compute the first key hint associated with apparatus $UE_j$ based on generator g and the random number $x_i$ by $X_1 = g^{x_i}$, e.g. as explained with respect to method 500, and then the respective apparatus $UE_j$ may set the first message $M_j$ comprising the first key hint, which is denoted as first key agreement message in scheme 1500, wherein this first message $M_j$ may correspond to the the first message $M_j$ provided by apparatus $UE_j$ in method 500 in FIG. 5a and as shown in FIG. 5b. The first message $M_j$ shown in scheme 1500 may comprise, as already explained with respect to method 400, the first key hint $X_i$, and the first identifier $PID_i$ of the respective ith apparatus (i.e., apparatus $UE_i$), the session identifier $SID_I$, and parameter indicating that message $M_i$ is of type first message comprising the first key hint, wherein this parameter may be represented by a "1".

Then, in round 1, a signature associated with the first message $M_j$ is determined by the respective apparatus $UE_j$ (reference sign 400' in scheme 1500), wherein this is performed as explained with respect to method 400, in particular with respect to actions 410 and 420 of method 400.

Then, as indicated by reference sign 500' in FIG. 15 and in accordance with method 500 of FIG. 5a and as shown in FIG. 5b, the first message $M_j$ and the signature $\sigma_i$ determined based on the first message $M_i$ is provided from apparatus $UE_i$ to a first further apparatus 310' (e.g. $UE_{i-1}$) and to a second further apparatus 310" (e.g. $UE_{i+1}$).

This round 1 may be performed for any of the apparatuses of the set of apparatuses.

In round 2 of the scheme 1500, apparatus $UE_i$ receives a first received message $M_{i-1}$ and a second received message $M_{i+1}$, each comprising the first key hint $X_j$ of the respective apparatus $UE_j$ (j=i-1 or j=i+1) provided by respective apparatus $UE_j$, e.g. as explained with respect to method 600, wherein this receiving the messages may be performed during action 220, and wherein this receiving the first received message $M_{i-1}$ and a second received message $M_{i+1}$ (reference sign 600" in scheme 1500) correspond to the receiving the messages $M_{i-1}$ and a second received message $M_{i+1}$ as depicted in FIG. 6b.

Then, apparatus $UE_i$ verifies (reference number 600" in scheme 1500) the first received message $M_{i-1}$ and a second received message $M_{i+1}$, as explained with respect to method 600 depicted in FIG. 6a.

If verification is successful, apparatus $UE_i$ determines (reference sign 710' in scheme 1500) a first key $K_i^1 = X_{i-1}^{x_i}$ based on the first key hint $X_{i-1}$ of the apparatus $UE_{i-1}$ associated with the first receive message received message $M_{i-1}$, and determines a second key $K_i^2 = X_{i+1}^{x_i}$ based on the first key hint of the apparatus $UE_{i+1}$ associated with the second receive message $M_{i+1}$, wherein random number $x_i$ may represent the random number $x_i$ associated with apparatus $UE_i$ and may be associated with the first key hint $X_i$ associated with the $UE_i$, by the generator g: $X_i = g^{x_i}$, as explained with respect to action 710 of method 700. Furthermore apparatus $UE_i$ determines the second key hint $Y_i$, e.g. by $$Y_i = \frac{K_i^1}{K_i^2}$$

reference sign 710' in scheme 1500), as already explained with respect to action 710 of method 700.

Then, apparatus $UE_i$, sets a second message $\underline{M}_i$ configured to be provided to each other apparatus $UE_j$ of the set of apparatuses, wherein $j \neq i$ holds, and wherein the second message $\underline{M}_i$ comprises the second key hint $Y_i$ determined by apparatus $UE_i$. The second message $\underline{M}_i$ comprises the second key hint $Y_i$, the session identifier $SID_I$, the first identifier $PID_i$ of apparatus $UE_i$, and an parameter indicating that message $M_i$ is of type second message comprising the second key hint, wherein this parameter may be a "2", as explained with respect to action 720 of method 700.

Then, apparatus $UE_i$ determines (reference sign 400' in scheme 1500) a signature $\underline{\sigma}_i$ associated with the second message $\underline{M}_i$, as explained with respect to method 400.

Apparatus $UE_i$ provides (reference sign 720' in scheme 1500) this second message $\underline{M}_i$ together with signature $\underline{\sigma}_i$ to each other apparatus of the set of apparatuses, i.e., the second message $\underline{M}_i$ may be provided to each of apparatuses $UE_j$, wherein $j \in \{1, \ldots, i-1, i+1, \ldots n\}$ holds, as explained with respect to action 720 of method 700. This may be considered to a broadcast of second message $\underline{M}_i$ from apparatus $UE_i$ to other apparatus of the set of apparatuses, as depicted as an example in FIG. 7b.

This round 2 may be performed for any of the apparatuses of the set of apparatuses.

In phase "Key Generation" of the scheme 1500 the apparatus $UE_j$ determines the session key.

Apparatus $UE_j$ receives (reference sign 810' of scheme 1500) the n−1 second messages $\underline{M}_j$, wherein $j \in \{1, \ldots, i-1, i+1, \ldots n\}$ holds, wherein j identifies the apparatus $UE_j$ which has provided or provides the respective message $\underline{M}_j$ from the other apparatuses of the set of apparatuses, as explained with respect to action 810 of method 800 (in method 800 the received second messages are denotes as MR). Each of the n−1 received messages $\underline{M}_j$ received by apparatus $UE_i$ is provided (and thus associated with) from a different apparatus $UE_j$ of the other apparatuses of the set of apparatuses than apparatus $UE_i$, i.e., $j \in \{1, \ldots, i-1, i+1, \ldots n\}$ holds. Accordingly, apparatus $UE_i$ knows the second key hints of the other apparatuses $UE_j$, wherein $j \in \{1, \ldots, i-1, i+1, \ldots n\}$.

As indicated by reference sign 600" in scheme 1500, apparatus $UE_j$ verifies each message of the received messages $\underline{M}_j$ based on the signature $\underline{\sigma}_i$ associated with the respective message $\underline{M}_j$, as explained with respect to method 800, wherein this verification is performed based on method 600 depicted in FIG. 6.

If verification is successful, apparatus $UE_j$ determines the session key $SK^{SID_I}$ based on the second key hint of each of the n−1 received second messages, as indicated by reference sign 900', wherein this determining the session key $SK^{SID_I}$ is performed as already described with respect to method 900 depicted in FIG. 9.

This phase "Key Generation" may be performed for any of the apparatuses of the set of apparatuses.

In phase "Group Session Activation" of the scheme 1500 the apparatus UE$_j$ determines a hash value based on the session key SK$^{SID_l}$ and the third hash function, wherein this hash value is denoted as session key seed in scheme 1500 (reference sign 1070'9, and wherein this hash value is determined as explained with respect to action 1070 in method 1000. Then, apparatus UE provides (reference sign 1310' of scheme 1500) the hash value determined based on the session key SK$^{SID_l}$ to the central network instance, as explained with respect to action 1070 of method 1000.

This may be performed for any of the apparatuses of the set of apparatuses.

The central network instance CN receives for each apparatus of the set of apparatus the respective hash value based on the session key determined by the respective apparatus (reference sign 1310' of scheme 1500), as already explained with respect to action 1310 of method 1300. Then, the central network instance CN checks whether all hash values based on the session key are the same (reference sign 1320' in scheme 1320), wherein this may be performed as described with respect to action 1320 of method 1300. If yes, the central network instance CN may store the hash value based on the session key and may activate the communication session (reference sign 1330' of scheme 1500), as explained with respect to action 1330 of method 1300.

Afterwards, for instance, secure D2D communication using the session key SK$^{SID_l}$ may be performed between apparatuses of the set of apparatuses (reference sign 1510 of scheme 1500).

Figure 21:
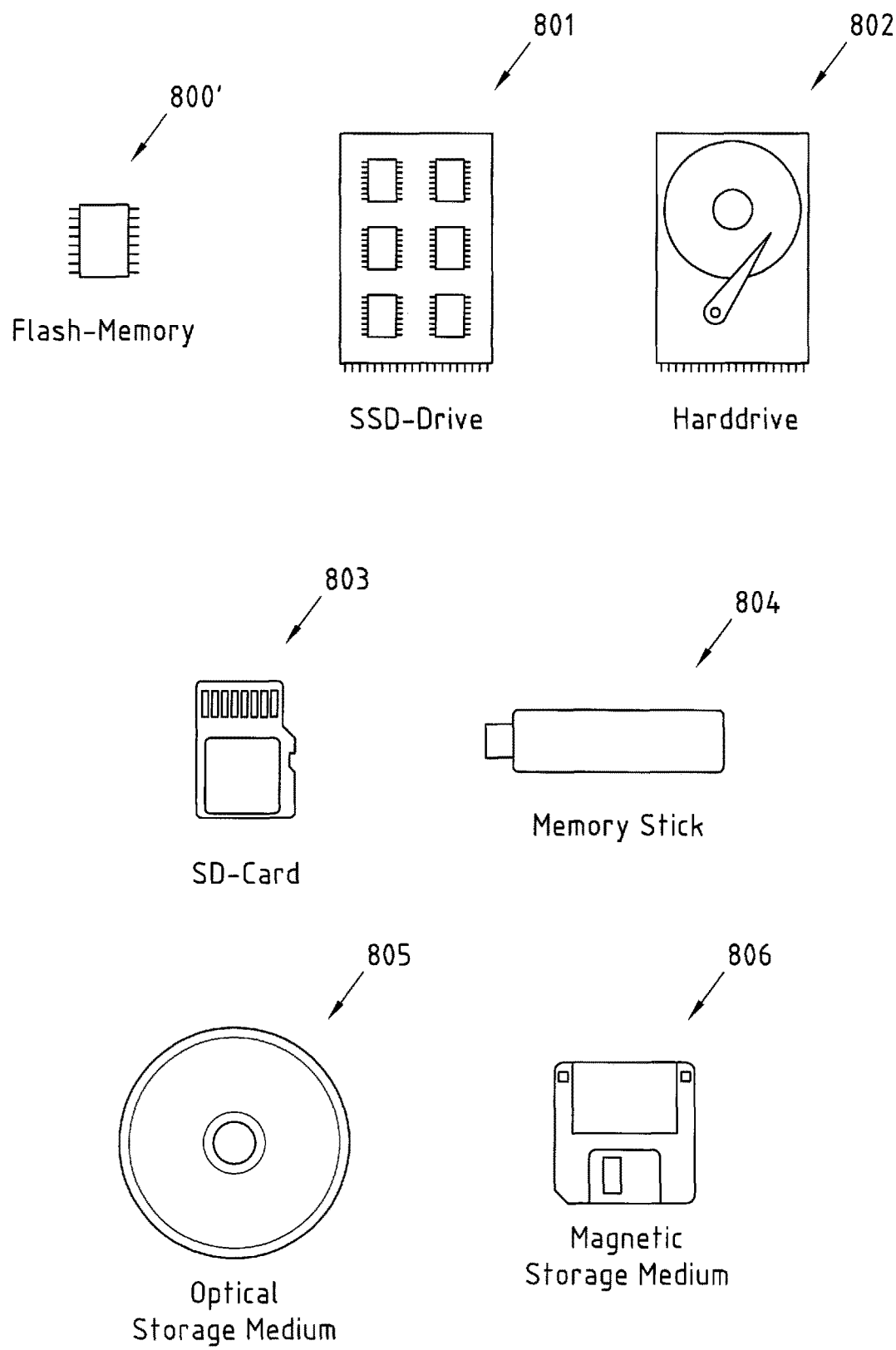
FIG. 21 is a schematic illustration of examples of tangible storage media according to the present invention.

FIG. 21 is a schematic illustration of examples of tangible storage media according to the present invention, that may for instance be used to implement memory 11 of FIG. 1, program memory 313, 313', 313" of FIG. 3 and/or program memory 314, 314', 314" of FIG. 3. To this end, FIG. 8 displays a flash memory 800', which may for instance be soldered or bonded to a printed circuit board, a solid-state drive 801 comprising a plurality of memory chips (e.g. Flash memory chips), a magnetic hard drive 802, a Secure Digital (SD) card 803, a Universal Serial Bus (USB) memory stick 804, an optical storage medium 805 (such as for instance a CD-ROM or DVD) and a magnetic storage medium 806.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 101, 311, 311', 311" of FIGS. 1 and 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Furthermore, the wording "at least one of (i) . . . , (ii) . . . (n)" comprising n elements has to be understood that only one element of the n elements may be selected, or any combination of two or more of the n elements may be selected, or, that all n elements may be selected.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

What is claimed is:

1. An apparatus comprising:
   at least one processor; and
   at least one memory including computer program code;
   the at least one memory and the computer program code configured to, with the at least one processor, cause the apparatus at least to perform:
   obtaining a first identifier associated with the apparatus, wherein the first identifier is different from a second identifier associated with the apparatus;
   providing one or more messages to at least one further apparatus of a set of one or more apparatuses, wherein at least of the one or more messages comprises key information of the apparatus and is associated with the first identifier associated with the apparatus; and
   determining a session key of a communication session associated with the apparatus and at least one further apparatus, based on one or more messages received from at least one further apparatus of the set of one or more apparatuses, wherein at least one of the messages comprises key information of the respective further apparatus and is associated with a first identifier associated with the respective further apparatus, wherein the apparatus is associated with a public key and the public key can be determined based on the first identifier associated with the apparatus and a first hash function, wherein the at least one memory and the computer program code are configured to, with the at least one processor, cause the apparatus at least to perform at least one message of the one or more messages provided to at least one further apparatus of the set of one or more apparatuses:

determining a hash value based on the respective message and a second hash function;

determining a signature based on the hash value, the public key and a private key associated with the apparatus; and providing the signature to the further apparatus associated with the respective message.

2. The apparatus according to claim 1, wherein the at least one memory and the computer program code are configured to, with the at least one processor, cause the apparatus at least to perform verifying at least one message of the one or more received messages.

3. The apparatus according to claim 2, wherein said verifying comprises:

verifying the respective message based on a signature associated with the message and based on the hash value and a public key associated with the further apparatus associated with the message; wherein the public key can be determined based on the first identifier associated with the apparatus and a first hash function.

4. The apparatus according to claim 1, wherein the at least one memory and the computer program code are configured to, with the at least one processor, cause the apparatus at least to perform determining a first key hint, wherein the key information of a first message of the one or more messages by the apparatus comprises said first key hint.

5. The apparatus according to claim 1, wherein a first received message of the one or more messages comprises a first key hint of the further apparatus associated with the first received message.

6. The apparatus of claim 5, wherein the at least one memory and the computer program code are configured to, with the at least one processor, cause the apparatus at least to perform determining a first key based on the first key hint of the further apparatus associated with the first received message, and, optionally, a second key based on the first key hint of the further apparatus associated with the second received message.

7. The apparatus according to claim 5, wherein the at least one memory and the computer program code are configured to, with the at least one processor, cause the apparatus at least to perform determining, based on the first key hint of the first received message, and, optionally, based on the first key hint of the second received message, a second key hint.

8. The apparatus of claim 1, wherein said one or more messages received by the apparatus are a plurality of received messages, wherein at least one message of the plurality of received messages comprises at least one second key hint associated with at least one further apparatus of the set of one or more apparatuses.

9. The apparatus of claim 1, wherein the at least one memory and the computer program code are configured to, with the at least one processor, cause the apparatus at least to perform receiving information provided by a central network instance, the information comprising at least one of:
the first identifier associated with the apparatus, and/or
a first hash function, and/or
a second hash function, and/or
a third hash function, and/or
a generator g, and/or
a function e associated with bilinear pairing, and/or
a system public key, and/or
a public key associated with the apparatus, wherein the public key can be determined based on the first hash function and the first identifier associated with the apparatus, and/or
a private key associated with the apparatus corresponding to the public key associated with the apparatus, provided by the central network instance.

10. The apparatus of claim 1, wherein the at least one memory and the computer program code are configured to, with the at least one processor, cause the apparatus at least to perform:
communicating securely with one or more apparatuses of the at least one further apparatus during the communication session based on the determined session key, wherein the apparatus and the at least one further apparatus represent a group associated with the communication session; and revoking the group based on at least one of an expiration date associated with the session key of the communication session, and/or a change of membership in the group, wherein said revoking the group comprises determining a new session key.

11. The apparatus of claim 10, wherein the at least one memory and the computer program code are configured to, with the at least one processor, cause the apparatus at least to perform, if the expiration date associated with the session key is expired and there are changes of the membership in the group:
providing one or more messages to at least one further apparatus of the set of one or more apparatuses, wherein at least one of the one or more messages comprises key information of the apparatus and is associated with the first identifier associated with the apparatus; and
determining the new session key of the communication session associated with the apparatus and the at least one further apparatus, based on one or messages received from at least one further apparatus of the set of one or more apparatuses, wherein at least one of the one or more messages comprises key information of the respective further apparatus and is associated with a first identifier associated with the respective further apparatus, wherein the apparatus and the at least one further apparatus are members of the group after the membership in the group has changed.

12. A non-transitory computer readable medium comprising program instructions for causing an apparatus to perform at least the following:
obtaining a first identifier associated with the apparatus, wherein the first identifier is different from a second identifier associated with the apparatus;
providing one or more messages to at least one further apparatus of a set of one or more apparatuses, wherein at least one of the one or more messages comprises key information of the apparatus and is associated with the first identifier associated with the apparatus; and determining a session key of a communication session associated with the apparatus and at least one further apparatus, based on one or more messages received from at least one further apparatus of the set of one or more apparatuses, wherein at least one of the messages comprises key information of the respective further apparatus and is associated with a first identifier associated with the respective further apparatus wherein the apparatus is associated with a public key and the public key can be determined based on the first identifier associated with the apparatus and a first hash function, wherein the at least one memory and the computer program code are configured to, with the at least one processor, cause the apparatus at least to perform at least one message of the one or more messages provided to at least one further apparatus of the set of one or more apparatuses:

determining a hash value based on the respective message and a second hash function;

determining a signature based on the hash value, the public key and a private key associated with the apparatus; and providing the signature to the further apparatus associated with the respective message.

13. An apparatus comprising:
at least one processor; and
at least one memory including computer program code;
the at least one memory and the computer program code configured to, with the at least one processor, cause the apparatus at least to perform:
obtaining a first identifier associated with the apparatus, wherein the first identifier is different from a second identifier associated with the apparatus;
providing one or more messages to at least one further apparatus of a set of one or more apparatuses, wherein at least of the one or more messages comprises key information of the apparatus and is associated with the first identifier associated with the apparatus; and
determining a session key of a communication session associated with the apparatus and at least one further apparatus, based on one or more messages received from at least one further apparatus of the set of one or more apparatuses, wherein at least one of the messages comprises key information of the respective further apparatus and is associated with a first identifier associated with the respective further apparatus,
wherein the at least one memory and the computer program code are configured to, with the at least one processor, cause the apparatus at least to perform verifying at least one message of the one or more received message,
wherein said verifying comprises:
determining a hash value based on the respective message and a second hash function; and
verifying the respective message based on a signature associated with the message and based on the hash value and a public key associated with the further apparatus associated with the message; wherein the public key can be determined based on the first identifier associated with the apparatus and a first hash function.

14. An apparatus comprising:
at least one processor; and
at least one memory including computer program code;
the at least one memory and the computer program code configured to, with the at least one processor, cause the apparatus at least to perform:
obtaining a first identifier associated with the apparatus, wherein the first identifier is different from a second identifier associated with the apparatus;
providing one or more messages to at least one further apparatus of a set of one or more apparatuses, wherein at least of the one or more messages comprises key information of the apparatus and is associated with the first identifier associated with the apparatus; and
determining a session key of a communication session associated with the apparatus and at least one further apparatus, based on one or more messages received from at least one further apparatus of the set of one or more apparatuses, wherein at least one of the messages comprises key information of the respective further apparatus and is associated with a first identifier associated with the respective further apparatus,
wherein the at least one memory and the computer program code are configured to, with the at least one processor, cause the apparatus at least to perform:
communicating securely with one or more apparatuses of the at least one further apparatus during the communication session based on the determined session key, wherein the apparatus and the at least one further apparatus represent a group associated with the communication session; and revoking the group based on at least one of an expiration date associated with the session key of the communication session, and/or a change of membership in the group, wherein said revoking the group comprises determining a new session key;
if the expiration date associated with the session key is expired and there are changes of the membership in the group:
providing one or more messages to at least one further apparatus of the set of one or more apparatuses, wherein at least one of the one or more messages comprises key information of the apparatus and is associated with the first identifier associated with the apparatus; and
determining the new session key of the communication session associated with the apparatus and the at least one further apparatus, based on one or messages received from at least one further apparatus of the set of one or more apparatuses, wherein at least one of the one or more messages comprises key information of the respective further apparatus and is associated with a first identifier associated with the respective further apparatus, wherein the apparatus and the at least one further apparatus are members of the group after the membership in the group has changed.

* * * * *